United States Patent [19]
Stilwell et al.

[11] Patent Number: 5,907,696
[45] Date of Patent: May 25, 1999

[54] NETWORK DEVICE SIMULATOR

[75] Inventors: Larry R. Stilwell, Fremont, N.H.;
Vishwae V. Gokhale, Acton, Mass.

[73] Assignee: Cabletron Systems, Inc., Rochester, N.H.

[21] Appl. No.: 08/675,473

[22] Filed: Jul. 3, 1996

[51] Int. Cl.$^6$ .................................................. G06F 11/30
[52] U.S. Cl. ............................... 395/500; 395/182.02
[58] Field of Search .......................... 395/500, 601,
395/182.02; 364/DIG. 1

[56] References Cited

U.S. PATENT DOCUMENTS

| | | | |
|---|---|---|---|
| 5,142,624 | 8/1992 | Patrick | 395/200 |
| 5,559,955 | 9/1996 | Dev et al. | 395/182.02 |
| 5,619,615 | 4/1997 | Pitchaikani et al. | 395/11 |
| 5,651,006 | 7/1997 | Fujino et al. | 370/408 |

OTHER PUBLICATIONS

"The SNMP Test Suite, Revision 4" by InterWorking Labs, Inc., http://www.iwl.com/SpecSheets/testuite.html (Oct. 09, 1996).

"What is the Agent Simulator" by Virtual Devices Incorporated, http://www.virtualdevices.com/ (Oct. 09, 1996).

"Network Tools Virtual Agent Page" by Network Tools Products, http:/www.networktools.colm/vaintrol.html (Oct. 28, 1996).

"Virtual Agent Overview," by Network Tools Products, http:/www.networktools.com/vaovrvw.html (Oct. 28, 1996).

"Network Tools Press Release" by Network Tools Products, http:/www.networktools.colm/vapress.html (Oct. 28, 1996).

"Virtual Agent ScanOID Application" by Network Tools Products, http:/www.networktools.com/scanoid.html (Oct. 28, 1996).

"Net Management Tool Offered by Start–Up" by CommunicationsWeek Interactive, http://www.networktools.com/commweek.hml (Oct. 28, 1996).

"Virtual Agent Creates Network Simulations" by PCWeek Online, http://www.networktools.com/pcweekonl.html (Oct. 28, 1996).

"Numerical Methods in C," Chapter 14 entitled "Statistical Descriptions of Data," by Press, W.H., Teukolsky, S.A., Vetterling, W.T., and Flannery, B.R. published by Cambridge University Press (1992).

Ulam, S.M.: "Monte Carlo Calculations in Problems of Mathematical Physics," in Modern Mathematics for the Engineer, E.F. Beckenbach, Second Series, McGraw Hill, New York (1961).

"Simple Agent: A SNMP Agent Simulator," Simple Soft Inc., http://www.smplsft.com/sagent.html (Mar. 21, 1996),..

"The Emanate Run–Time Extensible Agent System," SNMP Research International, Inc., http://www.snmp.com/emanateintro.html (Feb. 22, 1996).

"Why Emanate is better than SMUX," SNMP Research International, Inc., http://www.snmp.com/smux.html (Feb. 22, 1996).

"Libraries, Utilities, and MIB Tools," SNMP Research International, Inc., http://www.snmp.com/lumintro.html (Feb. 22, 1996).

"The SNMP Agent," SNMP Research International, Inc., http://www.snmp.com/agentintro.html (Feb. 22, 1996).

"The Packaged Agent System," SNMP Research International, Inc., http://www.snmp.com/pkgagentintro.html (Feb. 22, 1996).

Primary Examiner—Kevin J. Teska
Assistant Examiner—A. S. Roberts
Attorney, Agent, or Firm—Wolf, Greenfield & Sacks, P.C.

[57] ABSTRACT

Method and apparatus for creating the appearance of a network device and its communications, and in particular, an SNMP agent and its SNMP communications. A device dataset contains a plurality of counter variables having instance values which change over time and describe the behavior of the device on the network. A characterization file is created from the device dataset based on correlations among the variables and their instance values. The characterization file is used to generate predicted instance values for a simulated device.

27 Claims, 24 Drawing Sheets

| VARIABLE NAME | MEAN | STANDARD | LV | FREQUENCY TABLE (RANGE INT/COUNT) 1 2 3 ... 100 | $K_{ij}$ | GROUP NO. |
|---|---|---|---|---|---|---|
| A | 82 | +3 | 250 | 1 1 1 | 1 | 1 |

FIG. 12

|  | SINGLE PASS | CONTINUOUS LOOP | FREEZE FRAME |
|---|---|---|---|
| STARTING FRAME | THE FRAME ON WHICH THE PLAYBACK WILL BEGIN | THE FRAME ON WHICH THE PLAYBACK WILL BEGIN | THE FRAME ON WHICH TO BE FROZEN |
| ENDING FRAME | THE LAST FRAME IN THE DATASET TO BE PLAYED; THE AGENT ENGINE WILL MAINTAIN THE VALUES IN THIS FRAME UNTIL THE PLAYBACK PARAMETERS ARE CHANGED THROUGH THE PLAYBACK CONSOLE, OR THE AGENT ENGINE TASK IS TERMINATED. | THE LAST FRAME IN THE DATASET TO BE PLAYED BEFORE LOOPING BACK TO THE STARTING FRAME | NO EFFECT |

FIG. 20 ved via the router. In the printer example, the
NETWORK DEVICE SIMULATOR

FIELD OF THE INVENTION

This invention relates to a method and apparatus for creating the appearance of a network device and its communications, and in particular, an SNMP agent and its SNMP communications, on a computer network. The method and apparatus are useful in software development, testing, problem analysis, network planning, sales demonstrations and training.

BACKGROUND OF THE INVENTION

Devices on a computer network use a common underlying protocol to communicate with each other, such as the Transmission Control Protocol/Internet Protocol (TCP/IP). Above the carrier protocol, various upper level protocols are used for specific tasks such as the File Transfer Protocol (FTP), the Telnet Protocol, and the Simple Network Management Protocol (SNMP).

SNMP handles management of devices on a computer network. As an example, suppose a communications port, located on a router connecting subnets of a computer network, is handling data at too slow of a rate of speed. If the network manager wants to increase the speed of that router port, he or she, instead of traveling to where the router is physically located, can use the SNMP protocol to remotely instruct the router to increase the port speed. The instructions are sent via a (localized or distributed) network management station (NMS) which communicates with the router via the SNMP protocol. The router executes a program called an SNMP agent on the router's computer processor. The SNMP agent accepts the message from the NMS, determines the port which is to be altered, and then adjusts that port's speed as instructed in the SNMP message. This is just one example of how SNMP may be used to perform network management. It should be noted that SNMP may be used to control and monitor many types of network devices such as printers, routers, bridges, and even general purpose computers.

Devices managed via SNMP have many features, called objects, which can be manipulated remotely, via the SNMP protocol. The characteristics of the router port in the above example may be described by a set of objects. The network management station (NMS) sends a command to the network management agent to change an object's value within the device. The object's value is called the object instance. SNMP also allows the device to report the status, or value, of its various object instances back to the NMS. The device can have many objects associated with it, each having an instance, and the instances of those object may change over time. The SNMP agent running on the device tracks and updates these objects and their instances. Objects such as port speed, active connections, packets in, and packets out are but a few examples of objects that an SNMP agent, executing on a device, may keep track of. Being able to query a device using SNMP is useful so that the network manager is able to determine the status of that device on the network at any one point in time, as well as over a period of time. Things such as network congestion and peak-use rates may be determined from SNMP queries of objects in a remote device.

FIG. 1 illustrates the relationship between a network management computer station 11 and a real network device 12 controlled via SNMP, which communicate across a TCP/IP network 13. An SNMP agent 14, which executes on the remote network device 12, accesses (i.e., reads and writes to) a local database 15 which describes the objects of the device accessible by SNMP. This database is referred to as a Management Information Base (MIB). The MIB contains object identifiers (names) and corresponding instance values. For example, if a printer on a network uses SNMP, its MIB may contain objects which describe the operation of the printer from a network management standpoint, e.g., online/offline, paper available, tray empty, toner low, envelope tray empty, etc. These objects' instances are kept up-to-date by the SNMP agent running on the printer, and may be queried via SNMP over the network to check or alter the status of the printer.

The SNMP communications described above are independent of other communications which take place within a device. For instance, in the router example above, the SNMP communications between the NMS and the SNMP agent in the router are separate from the data communications which are being routed via the router. In the printer example, the SNMP messages which, for example, check to see if the toner is low in the printer, are distinguished from the data communications the printer receives which represent a document to be printed. The underlying medium, such as an Ethernet cable, is the same for both types of communications, and they may both use TCP/IP as the protocol to get the message from one device to the other, but upon arrival at the device, the SNMP communications are handled by the SNMP agent, whereas the other data communications are handled by other mechanisms within the device.

The present invention relates to methods and apparatus for simulating a network device, wherein the simulated device can respond to management requests and otherwise appear to other devices on the network as a "real" device.

SUMMARY OF THE INVENTION

During the design and development of new computer devices (hardware and/or software) and computer networks, it would be desirable to be able to test the inter-operability of one computer device with other devices to confirm that the one device functions as intended. It would also be desirable to enable a management application to be developed concurrently with a remote manageable device being developed, such that both the management application and the device would be completed at the same time.

For example, suppose a new SNMP manageable router were being developed. The present invention provides a computer which simulates the new router's SNMP data and responses to management queries, so as to test the management functionality. Thus, release of the new router can include a release of the management software required to control it.

An SNMP query to an SNMP agent (real or simulated) may include a request for the names of the SNMP variables (object instances) which exist within the MIB for that device, as well as the values of those variables. Many of these values change over time, and serve as "counters" for certain device characteristics. In a real SNMP device which is active on a network, counter variables such as "packets-received" are incremented each time a packet is received on a designated port. Thus, in a real device, SNMP variables may have different values for each query. If the values are viewed over a period of time, inter-relationships between past and present instance values for single variables, and amongst certain groups of variables, may be seen.

Suppose that a MIB variable in an SNMP agent counts packets for a data port of a device. If an error occurs in the transmission of one packet to that data port, another MIB variable which tracks errors for that data port will be incremented by the SNMP agent running on that device. Furthermore, there may be other MIB variables associated with the occurrence of an error in transmission for that data port. A "packets-lost" variable may be incremented if the error resulted in the packet having to be re-transmitted. In order for the sending device of the original packet to know to re-send it, an outgoing negative acknowledgment packet is sent to request re-transmission of the lost packet. The SNMP "packets-sent" variable would thus be incremented by the SNMP agent. If the original packet error resulted in a CRC correction of the data error, then possibly a "CRC-error-count" variable would be incremented by the SNMP agent. The point being made is that there are inter-relationships between the variables defined in the MIB for a device, such that if one variable's value changes, it may effect the values of other variables. These inter-relationships may be mathematically modeled if observed over time, and constitutes one aspect of the present invention.

Another aspect is to "record" SNMP data for a real, active device on a network, as the device's SNMP values change over a period of time. An SNMP simulation manager (running on a general purpose computer) may connect to a real device and query the real device's SNMP agent, periodically over time, for its instance values. These values may be saved in a dataset.

Once the SNMP instance values for a real device have been recorded into a dataset, one can then "characterize" this data and store it in a characterization file. Characterization of the recorded SNMP data consists of examining the recorded instance values to detect correlations and inter-relationships for certain valuables which changed over the time period of the recording. Then the actual device, or one like it, may be realistically simulated on the network using an SNMP agent engine and the characterization file. This enables an extremely robust and authentic simulation of SNMP data for a device.

One problem with known methods of simulation is that instance values chosen during a simulation are generally random values, and do not represent real life patterns. Thus, in prior systems the random numbers generated often produce far-fetched values and/or nonrealistic changes from one value to the next. In one aspect of the present invention, this randomness problem is overcome, and an SNMP simulator is disclosed which produces more accurate, non-random data via a characterization simulation method.

The characterization file, which is derived for example from a recorded dataset, may include: mean and standard deviation values (for each variable in the recorded dataset as it changed over time); a frequency table having a count in each range interval representing the changes in the instance values over the course of the recording session; correlation constants for groups of related variables, etc. The characterization file is a set of "rules" to be used by the SNMP agent simulator to realistically predict next instance values of the device variables.

Yet another aspect of the present invention is the ability to create a "fictional" device and simulate its SNMP communication on a network. For example, after "recording" SNMP data from a real device on the network into a recorded dataset, the present invention allows the user to produce a simulated SNMP agent with altered characteristics from the recorded data. For example, if a router from which SNMP data is recorded has 16 ports for communications, using a MIB editor it is possible to take parts of the recorded SNMP data and enter those parts into a new dataset. This provides the capability to create SNMP agent simulations for devices which do not exist, or are under development. Thus, the port objects and instances for the above 16-port router could be copied 8 times into a new dataset, using a MIB editor, so that an SNMP agent for a router with 128 ports could be simulated.

In yet another aspect of the present invention, an SNMP dataset may be created from existing template SNMP datasets containing MIB object definitions, but no instance values. The user may fill in the values of the object instances and customize the SNMP agent's characteristics.

In accordance with another aspect of the invention, a simulation manager is provided enabling three modes of running a simulation. In a static mode, the simulator produces the same value for an object's instance value for each query to the simulated SNMP agent device. In a playback mode, the simulator "replays" the recorded SNMP device communications, i.e., it reproduces the values of the object instances as they appeared during the recording process of the real device. This feature allows the SNMP communications of a real device to be recorded and used later for testing of its SNMP management application, when the device itself may no longer be attached to the network. The playback feature also allows selected time slots, or sample frames of the recorded data to be repeated. At the end of "playing" the recorded SNMP data, the simulator may continue to return the last value of the object instance as recorded. Alternatively, when the SNMP agent reaches the end of the recorded SNMP dataset, the agent engine may return to the beginning of the data set and "replay" the recorded data set again. This feature is advantageous because it provides an endless continuous simulation. Yet a third mode of playback, related to the continuous playback mode, is called the "freeze" frame mode and allows the user to control the speed at which the SNMP agent steps through the recorded sampled data of the dataset. In the freeze frame playback mode, the user controls which set of instance values of the SNMP objects is produced by the agent engine and is able to step forward and step backward through the recorded dataset. Thus, the continuous loop playback mode and the freeze frame playback mode allow precise control of how the simulated SNMP agent is perceived by other devices on the network which query the simulated device.

A third mode, referred to as animated simulation, utilizes the characterization file and has several advantages over current simulation techniques. By producing simulations that mimic precisely the real device SNMP communications, problems of inter-operation of equipment can be determined up front during the development stage, instead of after device release and shipment. Coexistence testing can be performed which is reliable and accurately represents the activity of devices which inter-relate to each other using SNMP communications. Furthermore, testing of remote networks can be performed without having to take the real devices to the remote location. Instead, an "on-the-road" simulation computer can be used, and the SNMP agent communications for devices which have been recorded presented in a realistic way to the remote network devices. Another advantage is that it allows proposed network configurations of devices to be staged for later use, and showcased to potential customers to prove their inter-operability with a customer's network before the actual device production and delivery has been completed. Another advantage is that network planning and integration activities may be supported by using multiple simulated devices to build a virtual network for stress and other testing of management applications.

These and other features of the present invention will appear from the following detailed description and drawings of certain exemplary embodiments.

BRIEF DESCRIPTION OF THE DRAWINGS

FIG. 12 is an example of a characterization file;

FIG. 20 is a table showing the effects which various playback modes have on the simulation of the SNMP agent;

DETAILED DESCRIPTION

The embodiment described herein consists of SNMP agent simulator software which runs on a general purpose computer connected to a network. The software can be used to create and execute simulations of SNMP network management agents.

Figure 1:
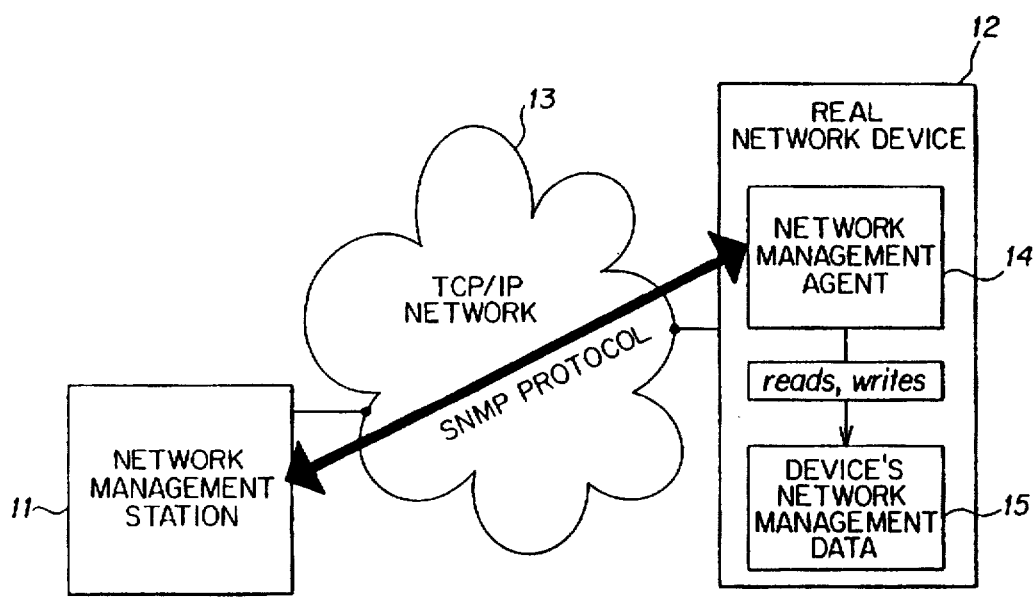
FIG. 1 is a prior art schematic illustration of the interaction between a network management station and a real device on a network which uses the SNMP protocol.

FIG. 1 depicts the relationship between a network management station (NMS) 11 and a real computer network device 12 which utilizes SNMP for management. The NMS is usually a general purpose computer, such as a personal computer or workstation, responsible for management of networked devices within an organization, such as a company. A person responsible for management and control of the network, usually called the network or systems manager, sits at NMS 11 (or another station) and executes remote control over the network devices via the SNMP protocol. The SNMP protocol uses an underlying TCP/IP network infrastructure 13 for communications between NMS and the managed devices. Many devices (such as 12) may be controlled by a single NMS.

FIG. 1 further depicts the relationship between SNMP information and the managed device itself. The entire body of information about the device and the network is called the Management Information Base (MIB) and is stored in local memory 15; the MIB is accessed by agent engine 14. The MIB contains variables or objects having associated values. These objects represent features or characteristics of the device which can be manipulated via SNMP commands.

Figure 2:
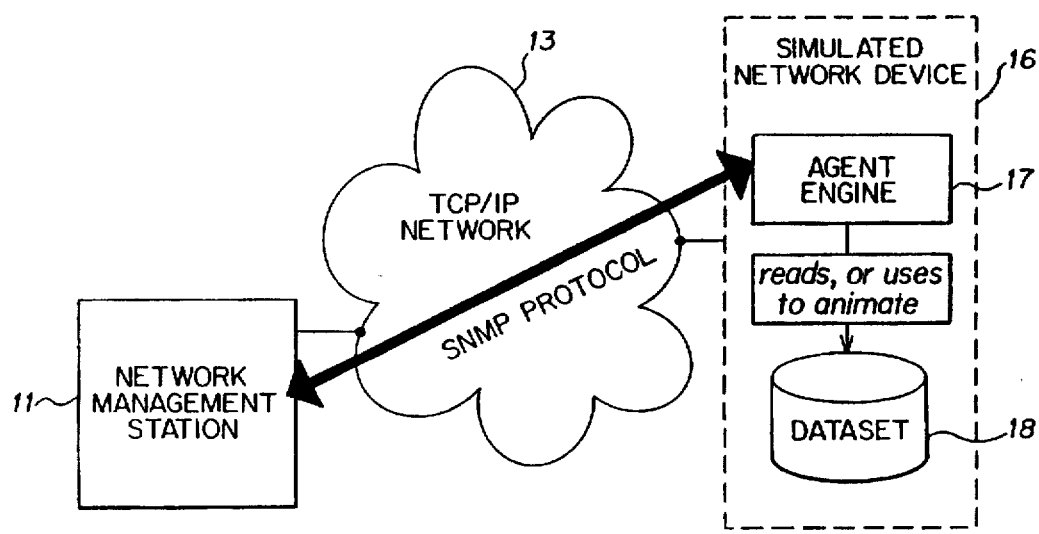
FIG. 2 is a schematic illustration of the interaction between a network management station and a simulated SNMP agent of the present invention, on a network using the SNMP protocol.

FIG. 2 shows the relationship between the NMS 11 and a simulated network device 16 which is implemented on a general purpose computer. An agent engine 17 reads information from a dataset 18, which describes the SNMP object characteristics of the device being simulated, in order to formulate responses to SNMP requests. Thus, when the NMS submits a request and receives a response from the simulated network device, the response appears to be from a real SNMP agent running on a real network device attached to the network. Thus, development of a network management application (for use on the NMS) can take place for a device being simulated, which may not yet exist. Furthermore, the simulated network device can interact with other network devices (not shown) as if it were a real device on the network.

Figure 3:
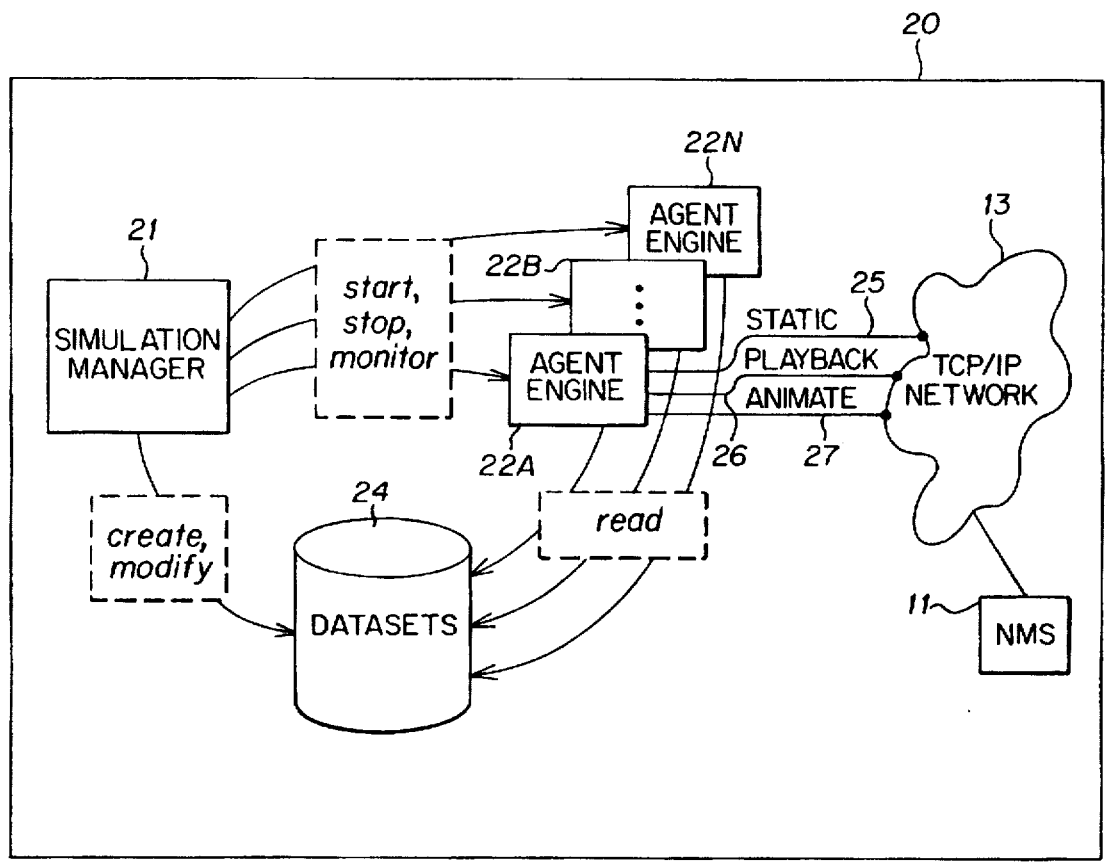
FIG. 3 is a schematic illustration of the functional relationships between a simulation manager, SNMP agent engines, and datasets of the present invention.

FIG. 3 illustrates in greater detail a general purpose computer 20 running the agent engine. A simulation manager 21 controls the agent engine(s) 22A, B, . . . N that perform the actual simulation of the SNMP communications on the network. The agent engines access the datasets 24 which contain the SNMP objects and instance values of the devices to be simulated. The agent engines are processes which respond to remote, incoming SNMP queries from the network management station 11, or any other remote network device which queries the computer 20. If a dataset contains object definitions which define active objects, that is, objects which create and send out data without being queried, then the agent engines can perform these tasks as well. The agent engine duplicates the appearance of a real SNMP agent running on a networked device, but does so without the actual device being present. The responses provided by the agent engines to the incoming SNMP queries contain the object instance values contained in or derived from the datasets.

It is possible, and many times desirable, to have multiple agent engines 22A–N executing at the same time as shown in FIG. 3. In such a case, the general purpose computer 20 which executes the SNMP simulator will be simulating more than one device.

An agent engine which is actively simulating the SNMP communications of a device needs to have a network address, just as a real networked device would use to communicate. Thus, a separate IP address is assigned for each agent engine which is simultaneously running on the general purpose computer.

The manager 21 is also responsible for creating and modifying datasets 24. Once a dataset is created for a device to be simulated, SNMP simulation of that device can begin by starting up an agent engine and directing it to the appropriate dataset.

There are three representative lines coming from agent engines 22A–N labeled "static" (25), "playback" (26) and "animate" (27), which designate three modes of simulation. In the "static" mode, if an agent engine is queried for SNMP data, it will return a constant value for its object instance. That is, in static mode, the SNMP object instance values never change from query to query.

In the "playback" mode, the agent engine replays the recorded SNMP data (stored in the dataset) from a real SNMP device. In this mode, the simulator agent engine produces SNMP responses to queries which represent the value of each object instance as it exists at that moment in time, in the recorded dataset. These values correspond to the values which existed for the same SNMP data in the real agent engine in the real network device as it was recorded. Thus, in a "playback" mode, a device may be simulated and will reproduce SNMP data exactly as the data was recorded from the real agent in the real device.

In the "animation" mode, the returned object instance values are calculated based on a formula from past instance values. The responses to SNMP queries during an animated simulation appear as if they had come from a real device. Generally, if the same dataset (i.e., characterization file) were run more than once with an agent engine in animated mode, the resulting SNMP data values would be different each time. The above three modes of the present invention will be discussed later in greater detail.

Figure 4:
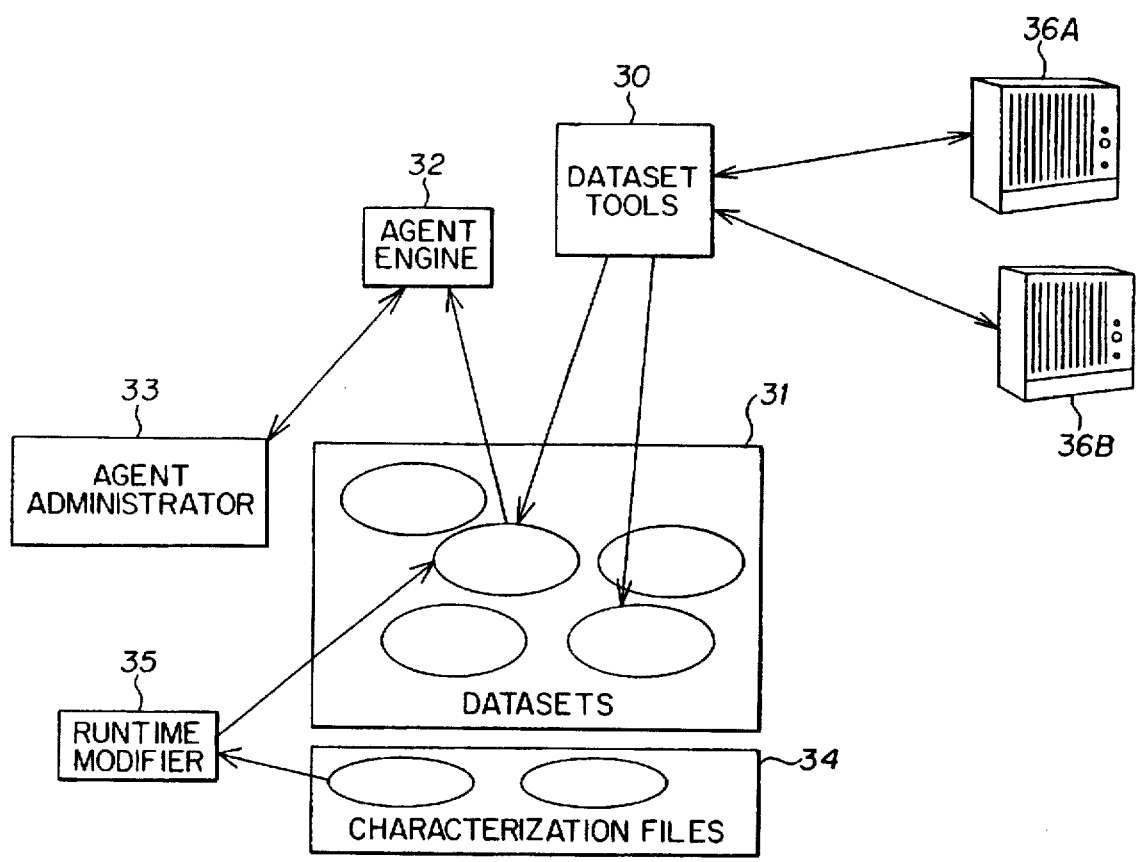
FIG. 4 is a block diagram showing the functional elements of the present invention and their interaction.

FIG. 4 illustrates the functions of the simulation software and the differences between the recorded or created datasets 31, and the characterization files 34 derived from the datasets 31. Dataset tools 30 provide the user with an easy way to create, collect, and/or modify data for an SNMP device (e.g., 36A, 36B . . . ). The dataset tools are primarily responsible for manipulation of datasets 31. A characterization file 34 is information which describes how each object and that object's instance values behave over time, e.g., it describes ranges for object instance values and mean and standard deviation values. A runtime modifier 35 produces the different computed values during execution of an "animated" simulation using one of the characterization files 34. After a dataset 31 for a device to be simulated is constructed, and a characterization file 34 (if required) is derived from one or more datasets 31, an agent engine 32 accesses the dataset 31 and/or characterization file 34 during the simulation. An agent administrator 33 is responsible for starting, stopping and monitoring of the agent engine. All of the functionality of the present invention may be implemented using a high-level computer programming language such as C or C++ on a computer system.

Figure 5:
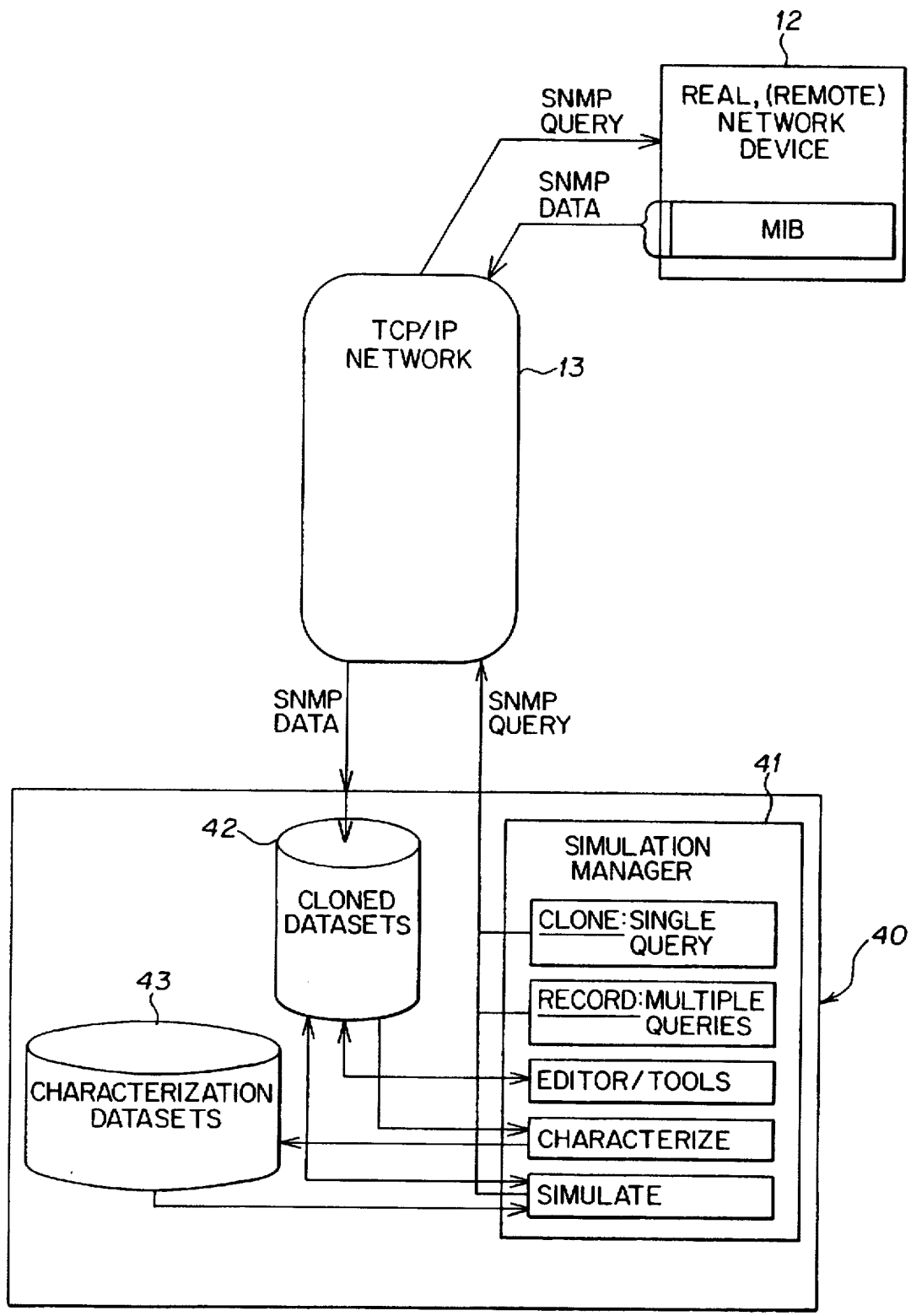
FIG. 5 is a more detailed block diagram illustrating certain operational features of the agent simulator.

One system embodiment will now be described in regard to FIGS. 5–7. A general purpose computer 40 runs a simulation manager 41; the general operations of the simulation manager and its interaction with various parts of the system (cloned datasets 42 and characterization datasets 43), and with network 13 and real network device 12, are depicted. The first and simplest type of simulation is to clone a device. Cloning a device refers to creating a dataset which is a "snapshot" of all of the SNMP object variables in a real networked device, and their associated instance values, at one point in time (single query). Thus, a cloned dataset 42 will contain the MIB names and one set of instance values of each SNMP variable within the SNMP agent running on the device.

Figure 6:
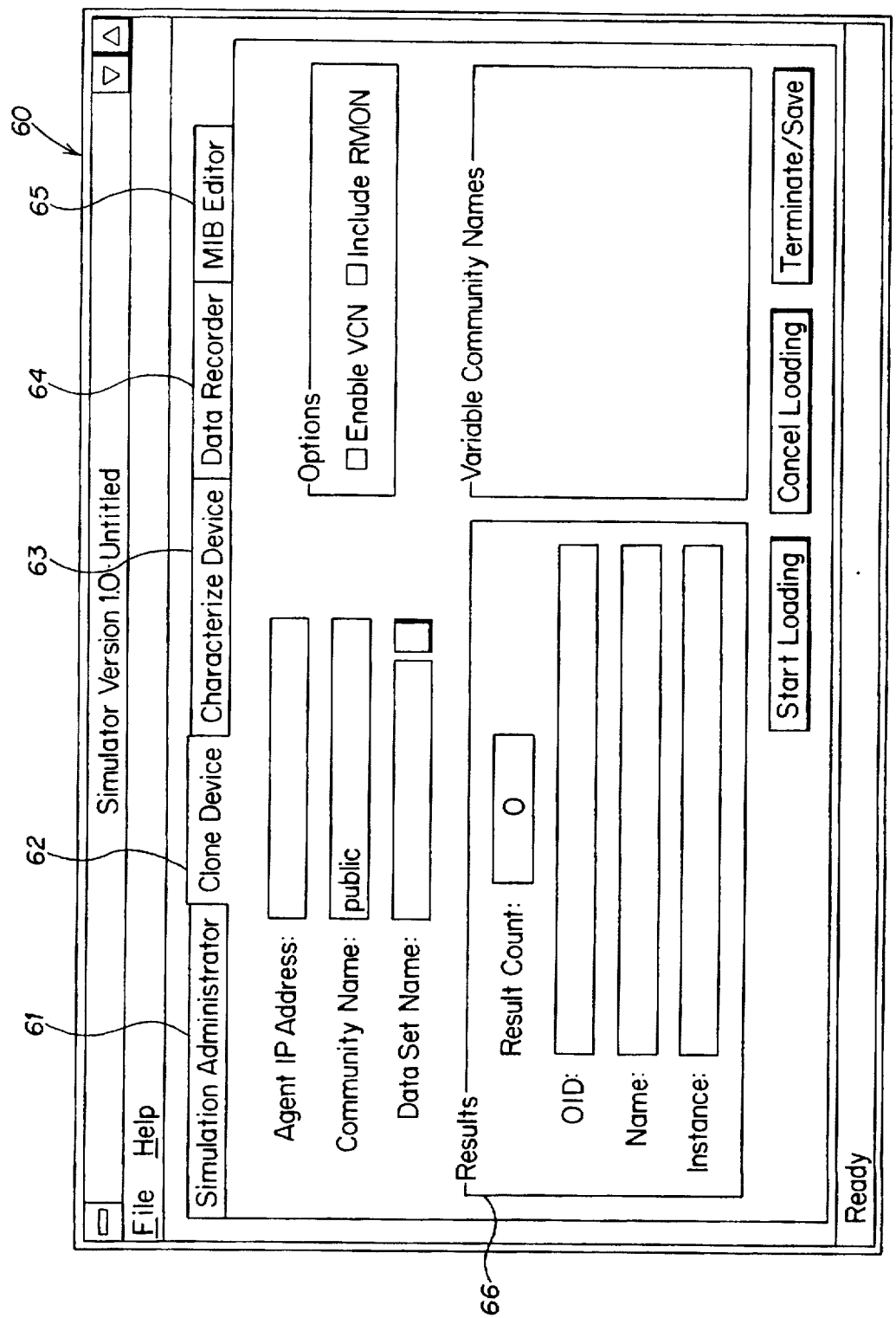
FIG. 6 shows a user interface with a "clone device" menu.

When a user runs the software on the general purpose computer 40, he/she is presented with an interface 60 as shown in FIG. 6. Across the top of the screen, there are tab-like buttons for selecting desired functions. They are labeled "Simulation Administrator" 61, "Clone Device" 62, "Characterize Device" 63, "Data Recorder" 64, and "MIB Editor" 65. The user selects, with a mouse or other commonly-known selection method, the features of the program they wish to use.

Figure 7:
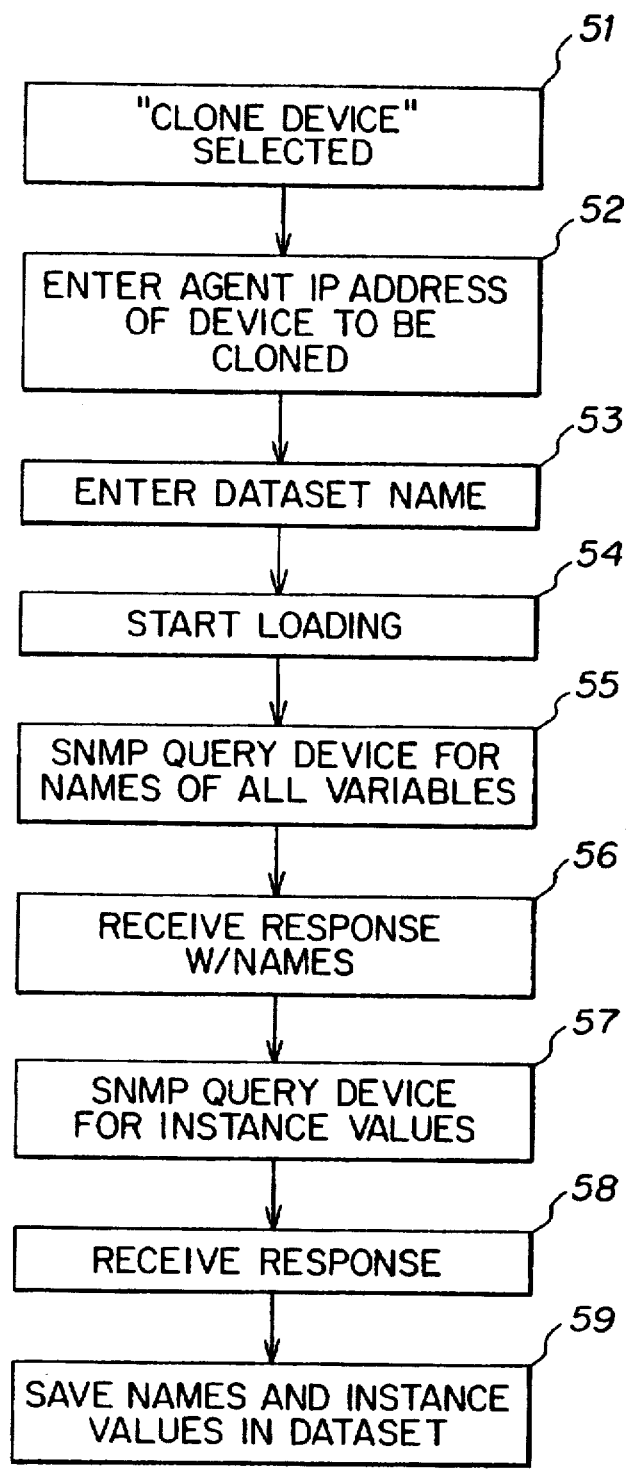
FIG. 7 is a flowchart of the procedure for cloning SNMP agent data.

The operations performed during cloning are illustrated in the flowchart of FIG. 7. The user first selects "Clone Device" (step 51) from the tab-like options at the top of the screen (FIG. 6). The user selects the IP address (step 52) of the SNMP agent which is to be cloned. The SNMP agent IP address is the address of the real, remote SNMP device 12 which exists on the network 13. Since the simulator is going to connect to the remote device to be cloned, existing network topology and routing conditions must permit this device to be accessed by the computer 40.

Alternatively, the address of a remote device to be cloned may be the address of another SNMP agent simulator. That is, if there is another active remote agent engine on the network, which is remotely simulating the SNMP communications of a device, it may be cloned. This is tantamount to the copying the dataset of the remote device which is being remotely simulated by the other agent engine.

After the IP address is chosen by the user, a name is given to the dataset (step 53). The user may select from a group of template datasets; that is, datasets which contain the names of the objects which are to be cloned, but do not yet contain the values associated with an instance of those objects. If no dataset is chosen, then all of the object names may be obtained from the device itself, during the cloning process.

During the next step, "Start Loading" (step 54), assuming the object names are not yet known, the simulator sends an SNMP (step 55) query for the names of the objects to the device having the designated IP address. After a name query response is received (step 56), a second SNMP query (step 57) to the device requests the instance values for the object names obtained in the name query. When the instance value response is received (step 58), the object names and instance values are saved in the dataset (step 59). A "Results" section 66 of the interface 60 (see FIG. 6) displays each object identification number ("OID") of the object names ("Name"), and object instance ("Instance"), for the device being cloned.

Figure 8:
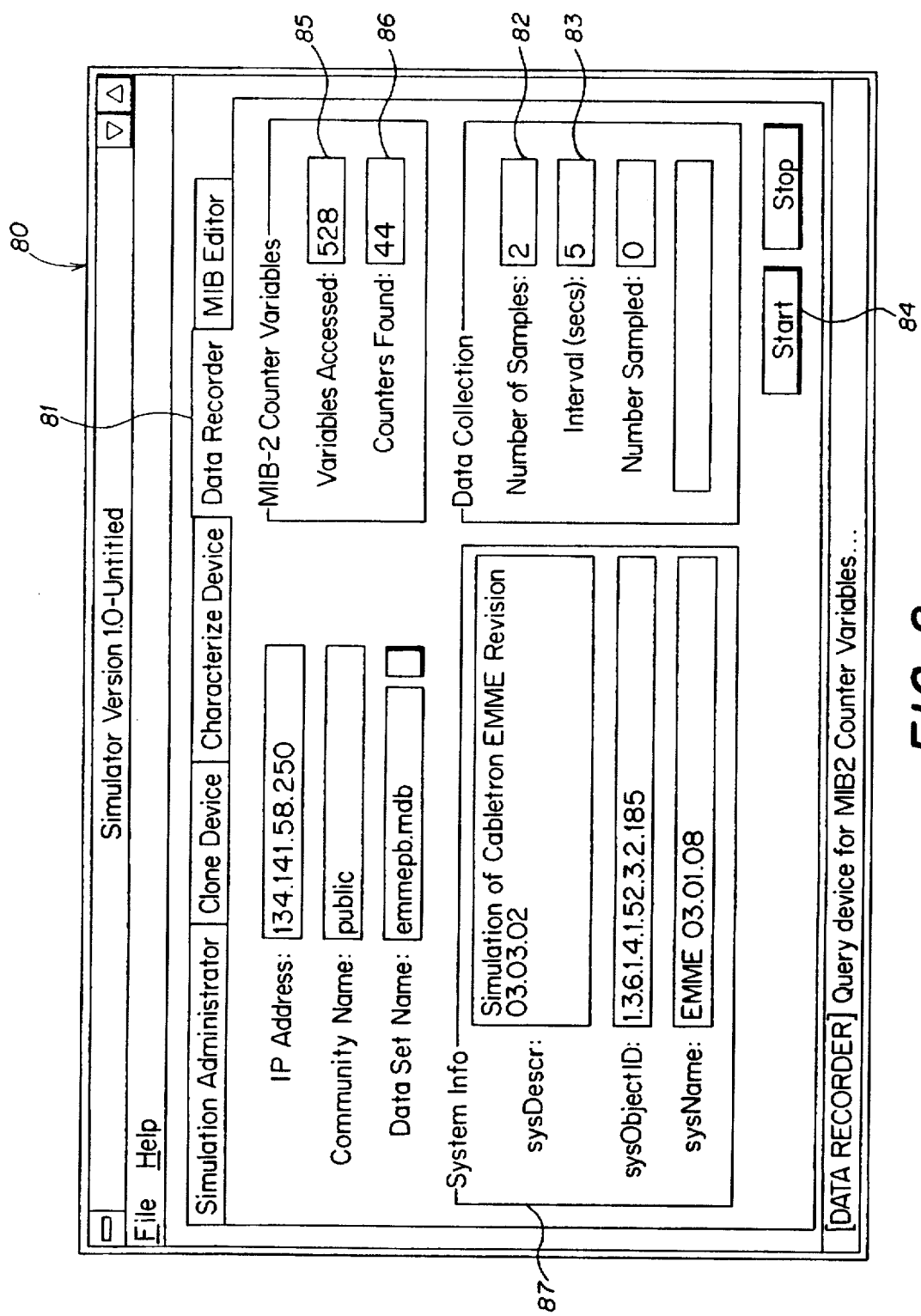
FIG. 8 shows a user interface with a data recorder menu.

FIG. 8 shows a user interface 80 according to another mode of operation. In this case, the user records SNMP data from an active agent on a network device, over a period of time. This is similar to cloning a device, except that instead of just querying the real device's SNMP agent once for object names and instance values, it queries the device repeatedly and saves all of the data obtained in a recorded dataset. In FIG. 8, the user has selected the "Data Recorder" option 81 from the top menu of the screen. The user then proceeds to enter the IP address of the device from which the data is to be recorded. When a dataset is selected, only those objects listed in the dataset are recorded. The process of recording from an SNMP agent running on a real network device requires that the user enter the number of samples of SNMP data they wish to obtain from the device during the recording. This is entered in the "Number of Samples" area 82 of the interface—here the number is "2". Finally, the sampling interval in seconds (here "5") is entered in the "Interval (secs)" area 83.

When the user hits the "Start" button 84 at the bottom of the interface, the simulator will query the remote SNMP agent, at the device designated by the IP address, every 5 seconds, for the designated number (2) of samples. At the end of all queries, the recorded dataset will contain a record of the remote devices' SNMP data (object instance values) for the recording session. Every 5 seconds, a snapshot of that remote devices SNMP data will have been obtained. Also during the recording process, status areas (on interface 80) report the number of variables (objects) accessed from the remote device (area 85), as well as the number of counter variables (objects) which were found (area 86). In the dataset, as will be described later, there are object definitions which specify a data type associated with the object. Some objects are "counters" which have varying instance values, and other objects have static values. These attributes of SNMP objects are known to those skilled in the art. Other information contained in interface 80 during the recording process is a description of the remote device being recorded from ("sysDescr"), the object name ("sysObjectID"), and the object identification ("sysName"), which are all in the area marked "System Info" 87. After recording is completed, the accumulated SNMP data is stored in the dataset indicated by the user.

The ability to record SNMP data from an active device on the network offers many advantages not possible with prior simulation methods. The data recording feature allows diagnosis of network problems and examination of network behavior. Since the SNMP data recording feature captures a series of SNMP network management object values in a single dataset, this information may be transported to another network, and used for simulation of the recorded device. Also, a dataset recorded at a remote location may be effectively copied by recording from another remote SNMP simulator. Thus, if a first general purpose computer on the network is running the present invention in simulation mode (i.e., "pretending" to be an active SNMP network device), a second simulator can record the data from the first simulator. This would, in effect, copy the recorded dataset from the first simulator.

Figure 9:
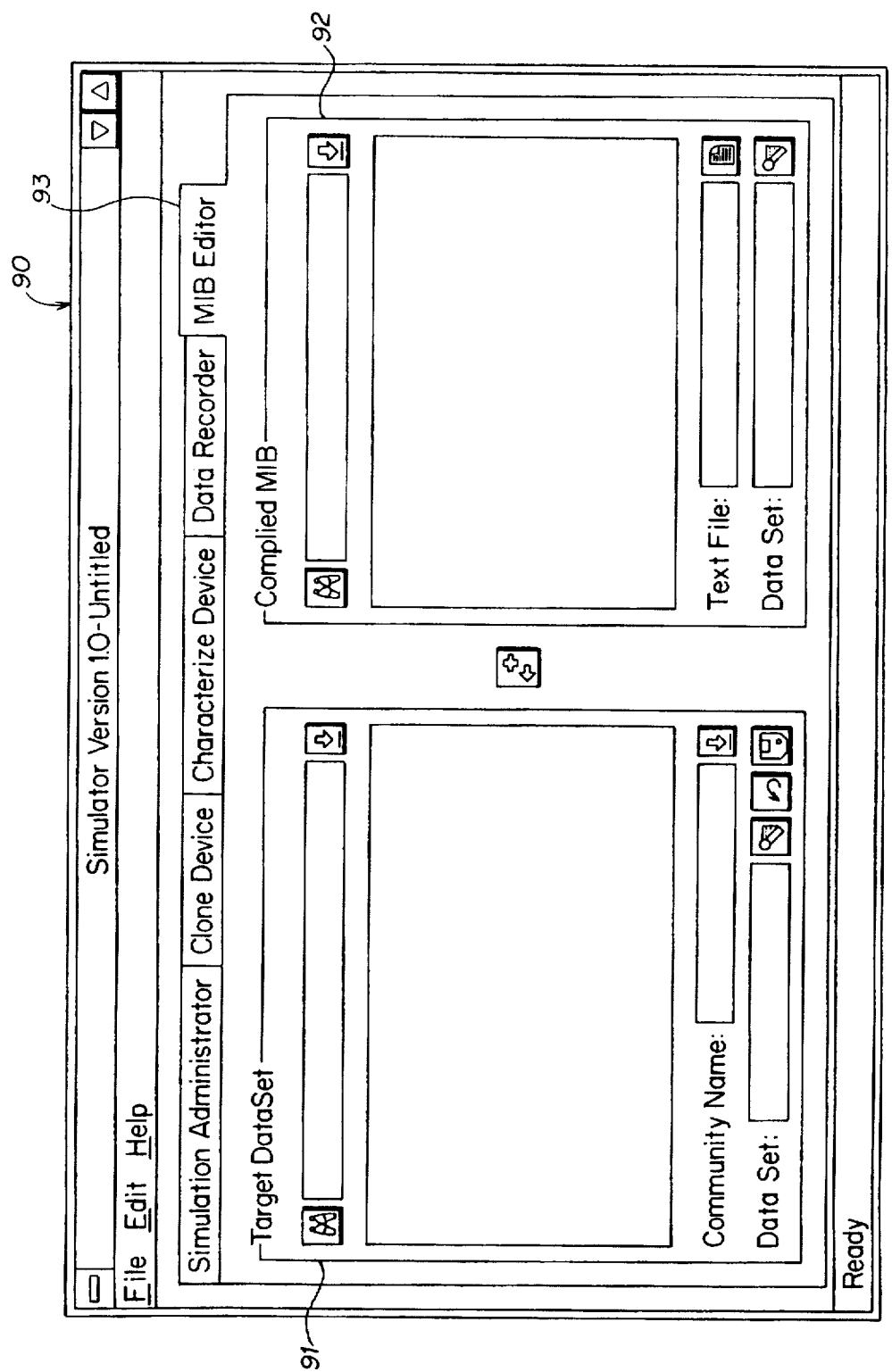
FIG. 9 shows a user interface with a MIB editor menu.

A third mode for creating a dataset, illustrated in FIG. 9, provides the user with a set of tools to create or edit datasets. An interface 90 is provided when a user selects "MIB Editor" 93 from the tab-like buttons along the top of the interface. The MIB editor provides a method for creating new datasets from existing datasets, and allows commingling of dataset objects and instance values. The user may select a dataset, such as a recorded dataset, and view the objects and instance values of this dataset in the right-hand "Compiled MIB" window (92). In the left-hand "Target DataSet" window (91), the user selects the dataset which is to be created or added to. The user may then select parts of the data shown in the "Compiled MIB" window (92) and, using a pointer or mouse, selectively drag the parts, such as an object and its instance value, into the "Target DataSet" window (91). Thus, the user may produce SNMP datasets, for use with the simulator, which consist of objects and their instance values obtained from different datasets. The "Target DataSet" window is in effect a construction area where pieces from other datasets may be assembled into a new dataset. This feature is unique and allows a user to create a dataset for an SNMP device which (device) does not exist in real life.

As an example, suppose a dataset contained recorded data from a router using the recording feature as previously described. If the user were to bring this dataset in the "Compiled MIB" window 92, the user now has the capability to take portions of that router's SNMP information from the recorded dataset and put it into a new custom dataset. This may include duplicating, many times, SNMP object information describing the ports of the router. Thus, the user can create a dataset for simulating a router with many more ports than any router which currently exists. Other SNMP object information may be entered into these customized datasets as well. It should be clear to those skilled in the art that the MIB editor feature provides a very powerful network test and diagnosis tool, since any type of hypothetical SNMP device may be created and then simulated on the network, as described later.

Figure 10:
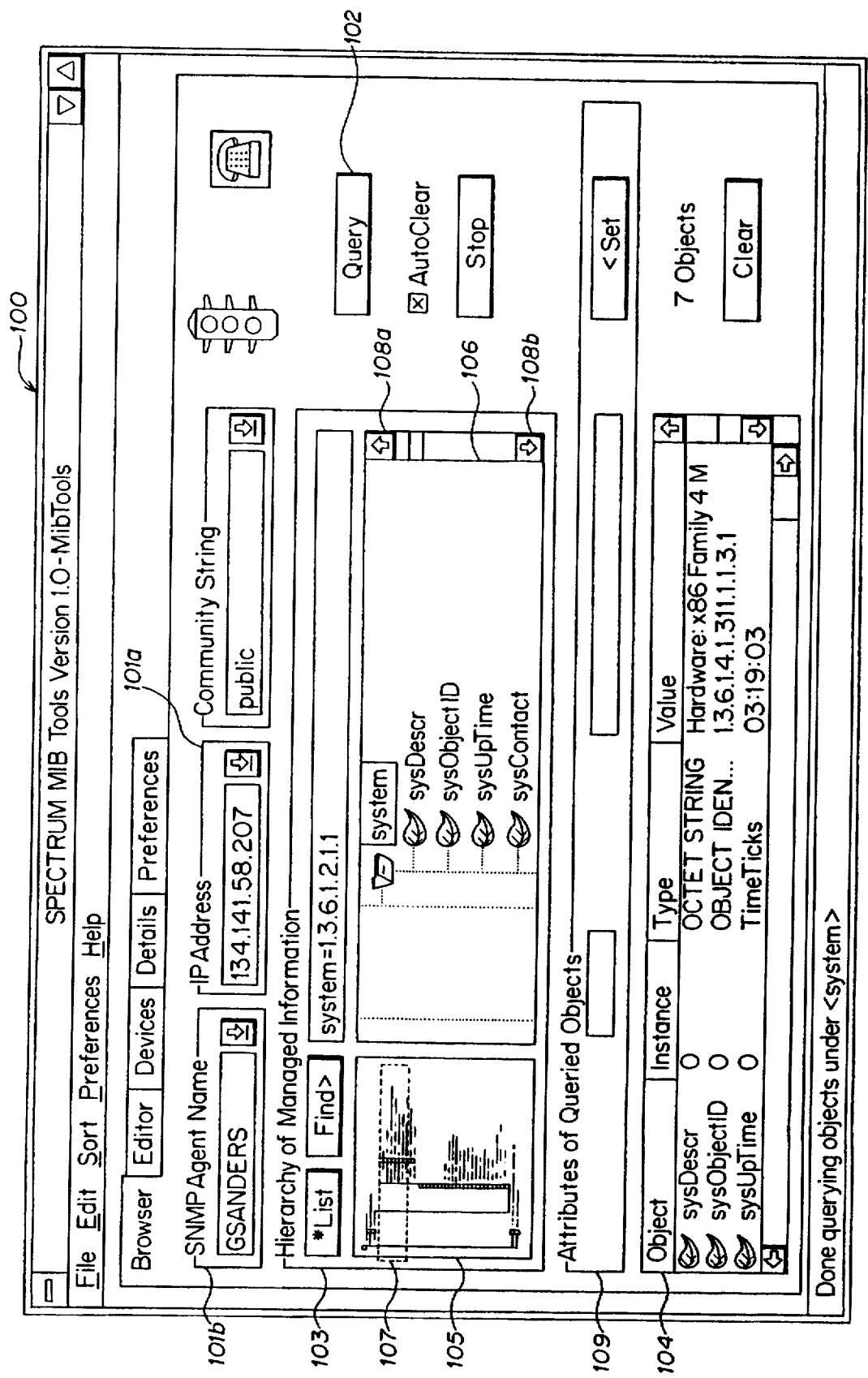
FIG. 10 shows a user interface for browsing a MIB definition file in order to edit an SNMP dataset.

A further embodiment, illustrated in FIG. 10, utilizes a set of software tools known as "MIB tools" for creating a dataset and performing other functions. FIG. 10 shows a MIB tools browser interface 100 as it appears when the user starts the program. MIB tools is a separate program which is run on the general purpose computer 40; it enables the user to connect to a remote, active network device which is running an SNMP agent and view all of the SNMP objects of that device (i.e., the device's MIB), in real time. In the same way as the SNMP data recording feature is connected to a remote device and queried for its SNMP data, the MIB tools allows connection and viewing of the SNMP information on a remote device.

In the user interface of FIG. 10, at the location marked "IP Address" (101a), the user enters the IP address of the remote device. The user also enters an SNMP agent name (101b), which is the name of the specific agent on the device to be interrogated; a device may be running more than one agent and thus the agent name is needed. If the user clicks on the "Query" button (102), the simulator connects to the device and to the SNMP agent specified by the user, and obtains the SNMP information (MIB information). The process for enabling the query is the same as that utilized in the cloning and recording embodiments, except that instead of storing the information in a dataset, it is displayed on the interface labeled "Hierarchy of Managed Information" (103). The result of a successful connection to the remote device and its remote SNMP agent, is shown in FIG. 10. The display area (104) shows all of the object names and instance values obtained from the remote SNMP agent, and the object types and values.

In an overview panel area (105), the interface shows a tree-like structure of the device's MIB information, where certain objects are grouped together. These grouped objects are represented by a folder icon. In the adjacent expanded panel area 106, a folder icon labeled "system" is shown, under which there are listed the objects related to this group. The list of objects and folders, called a MIB tree, may be scrolled through on the interface 106 by using the up/down arrows (108a, 108b) to the right of the list. Clicking on a folder icon expands the branch of the MIB tree to show the objects in that group. The overview panel (105) has a dotted box (107) superimposed on it, showing that portion of the MIB information which is currently displayed on the expanded display (106) to the right.

At the bottom of FIG. 10, the objects for a selected group folder are displayed, along with their instance, type, and value in window 104. The user is given the option to alter the value of the MIB information which was obtained from the remote device, before it is saved in a dataset for later use in a simulation. This feature allows the user to customize object instance values before they are saved in the dataset. The user selects an object name from the MIB tree that he/she wishes to modify, and its corresponding instance value appears in the "Attributes of Queried Objects" area (109). The user may then enter a new value for the object instance.

Figure 11:
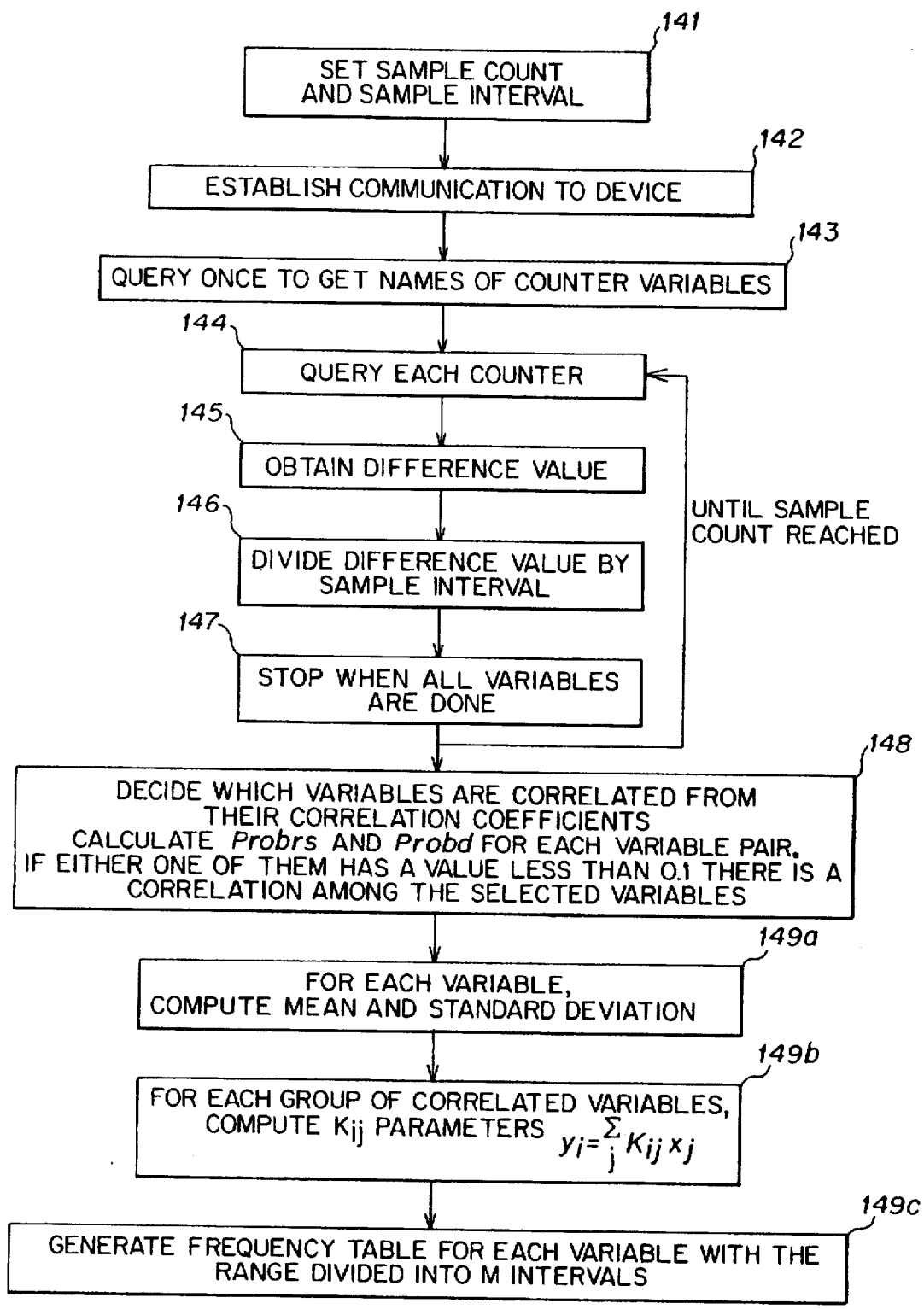
FIG. 11 is a flowchart of operations during collection and characterization of a network device.

Following creation of a dataset of object instance values, the dataset values are "characterized" (i.e., statistically analyzed) in order to enable a real-life animated simulation of reproduced instance values. FIG. 11 is a flow chart of the process by which the data may be collected and characterized.

The first step (141) is to set a "sample count" and "sample interval" for the collection of data. The sample count designates how many separate queries will be made to the device, and the sample interval designates how long to wait, in seconds, between each query. The more samples obtained, the more accurate the characterization of the device will be over time. The next step (142) is to establish an SNMP communication link between the real SNMP agent, and the general purpose computer. The SNMP agent is then queried (step 143) for the names of all of the counter "variables" (same as "instances") maintained in its MIB database. All of the counter variables in the device will be sampled once at each query interval.

The following steps are done once during the sampling period for each sample (query) interval. First, each variable name that was obtained from the variable name query is queried for its present numerical value (step 144). A "difference value" is determined, i.e., the difference from the value at the last interval (step 145), and each difference value is then divided by the sample interval (i.e., time between queries) (step 146), and the result is held in memory as a table of "scaled values". Dividing each difference value by the sample interval time provides a linear scaling of each value to a one second timeslice interval. For example, if the sample count were 100 and the sample interval times were 5 seconds apart, then the 100 (difference value) responses would each be divided by 5, to produce a linear set of 100 scaled values (scaled to one second). After all of the counter variables have been queried for their values, and have been divided by the sample interval time value and saved, the process waits (step 147) until the next sample interval comes up, and then the process repeats itself (steps 144–147). Thus, at the end of the entire sampling process, a snapshot of all of all variable (instance) values, in relation to a one second timeslice, for the real SNMP agent running on the network device will have been recorded for each sampling interval. After this data is obtained, the communications link may be dropped to the real SNMP agent.

To produce a characterization of this device data, e.g., a summary of how all of its variables appear over time, the recorded data is statistically (numerically) analyzed and correlated based on probabilities of variable value occurrences (step 148). This is done in one embodiment by determining linear correlation coefficients, such as Probrs and Probd, between each of the variables. These calculations allow a determination of whether or not there is a relationship between one counter variable and another. Probrs and Probd are well known statistical calculations and are performed in step 148. See for example "Numerical Methods in C", chapter 14 entitled "Statistical Descriptions of Data", by Press, W. H., Teukolsky, S. A., Vetterling, W. T., and Flannery, B. R., published by Cambridge University Press (1992).

As an example of this statistical correlation process, suppose there were 7 counter variables (a-G) in the SNMP device which was queried for data. Also, suppose the user choose to sample the device 100 times (sample count), once each second (sample interval). After dividing the 100 difference values by the sample size of 1 second, there are 700 values total—7 variables with 100 scaled values for each variable.

Since Probrs and Probd show correlations between two variables, Probrs and Probd will be calculated between each pair of variables. If either one of Probrs or Probd is less than 0.1 between two variables, then there is considered to be a correlation between these two variables. In our example, the value of Probrs(A,B) and Probd(A,B) will be calculated between variables a and B. Then Probrs(A,C) and Probd(A, C), Probrs(A,D) and Probd(A,D), and finally Probrs(A,E) and Probd(A,E) will be calculated. Then, the process repeats (for variables not yet correlated) with variable B, so Probrs (B,C), Probd(B,C), etc., will be calculated. When the process is finished, a determination of each variable's correlation to each of the others will have been determined. Each time the value of Probrs or Probd between two variables is below 0.1, then these variables are said to correlated to each other and the two variable names are grouped. It should be noted here that if two variables are initially correlated and grouped, and subsequently, another variable is determined to correlate to any one variable in that group, then that variable is grouped with the original two. Thus, there may be more than two variables placed in any group. A variable may be in no more than one group; a variable may be in no group if no correlation is found. There is then held in memory a 2-column table of group names and variable names, e.g.:

| group | variable(s) |
|---|---|
| 1 | a,B,C |
| 2 | F,G |
| 3 | |

The use of correlation determines which variables are statistically (numerically) related to one another. Probrs and Probd is one of a number of well-known and adequate formulas for correlation analysis. It will be appreciated by one skilled in the art that there are other statistical numerical correlation methods available, such as the Spearman coefficient correlation method as described in "Numerical Methods in C", supra.

The next step (149a) in characterizing variable data is to compute and hold in memory the mean value and the standard deviation value for each set of scaled values. This provides a mean (average) value which each variable attained during the sampling period, as well as the average change rate (standard deviation) that each variable attained.

Next, for each group of correlated variables, an estimation analysis is performed (step 149b) according to the formula:

$$y_i = \sum_j K_{ij} x_j$$

where $y_i$ is the value of the variable in the group I with the largest mean value, and $x_j$ are the remaining variable values in the group (i.e., the I variable is not also an x variable). a best value of $K_{ij}$ is determined for each variable in the group from this equation, and is stored; it represents a parameter used to predict a next instance variable value during an animation mode simulation. The best value of $K_{ij}$ (there being a value for each x variable and $K_{ij}=1$ for the I variable) is determined using a least squares estimation technique, such as singular value decomposition (see "Numerical Methods in C," supra).

Next, a frequency table is generated and stored (step 149c) for each variable. The frequency table lists how many occurrences of scaled values, within certain interval (bin)

ranges (upper and lower limits), a variable attained, over the entire query process. The frequency table partitions the variable range into some predefined M intervals or bins (for example M=100 intervals, so that the error in prediction is on the order of one percent), and then stores a count of how many of the scaled values fell into each of the 100 intervals. To compute the range intervals, we take the largest value (LV) of the 100 scaled values and divide by 100, providing a range interval (RI=LV/M). Then the ranges are constructed from the smallest value to the largest, adding the range interval to get the value of the next range. For example, if variable a had scaled values spanning from 50 to 250, the difference would be 200, and the range interval would be 2, i.e., largest value (smallest value)/M=(250−50)/100=2. The frequency table for variable a would show how many occurrences of each scaled value existed in each range interval (RI, 2RI, 3RI, 4RI . . . 100RI) during the sampling period. If the variable a maintained a value of 75 for 7 queries, and a value of 80 for 8 queries, the frequency table would reflect this by showing a count of "7" in the range interval from 74–75, and a count of "8" in the range interval of 80–81.

The data collection and characterization process just described is completed prior to device simulation. The resulting data is stored in a characterization file such as that shown in FIG. 12. By way of example only, a first column (variable name) includes an entry for variable "a", having a mean value of "82", a standard deviation value of "+3", and a largest value of "250". As previously discussed, the frequency table includes a count (number) of scaled values falling within each range interval. The characterization file also includes the $K_{ij}$ parameter, which for variable a having the largest mean, would be a value of "1". Also, the name of the group, of which variable a is a member (here "1"), is included. Other fields, and different arrangements of the fields, may be utilized in providing a characterization file.

The goal of device characterization is to produce computed probabilities and variable values which approximate, in a very realistic fashion, the activity of the counter variables based on an active SNMP device. The present invention is an improvement over prior random number generation schemes for producing the next instance value because the present invention enforces rules on the next allowable value to be created during a simulation. With this capability, it is possible to realistically simulate all of the variable characteristics for an SNMP agent on a network. The simulation, which mimics behaviors found in real SNMP agents, is so accurate that it is nearly impossible to detect differences, via SNMP queries, between real SNMP agents running on real network devices, and the simulations of the present invention running on a general purpose computer on the network. Furthermore, the simulation is never ending. The simulation can continue to predict new values, using the device characterization information, for SNMP variables, and continue to respond to SNMP queries, for as long as the user allows the simulation to continue.

Figure 13:
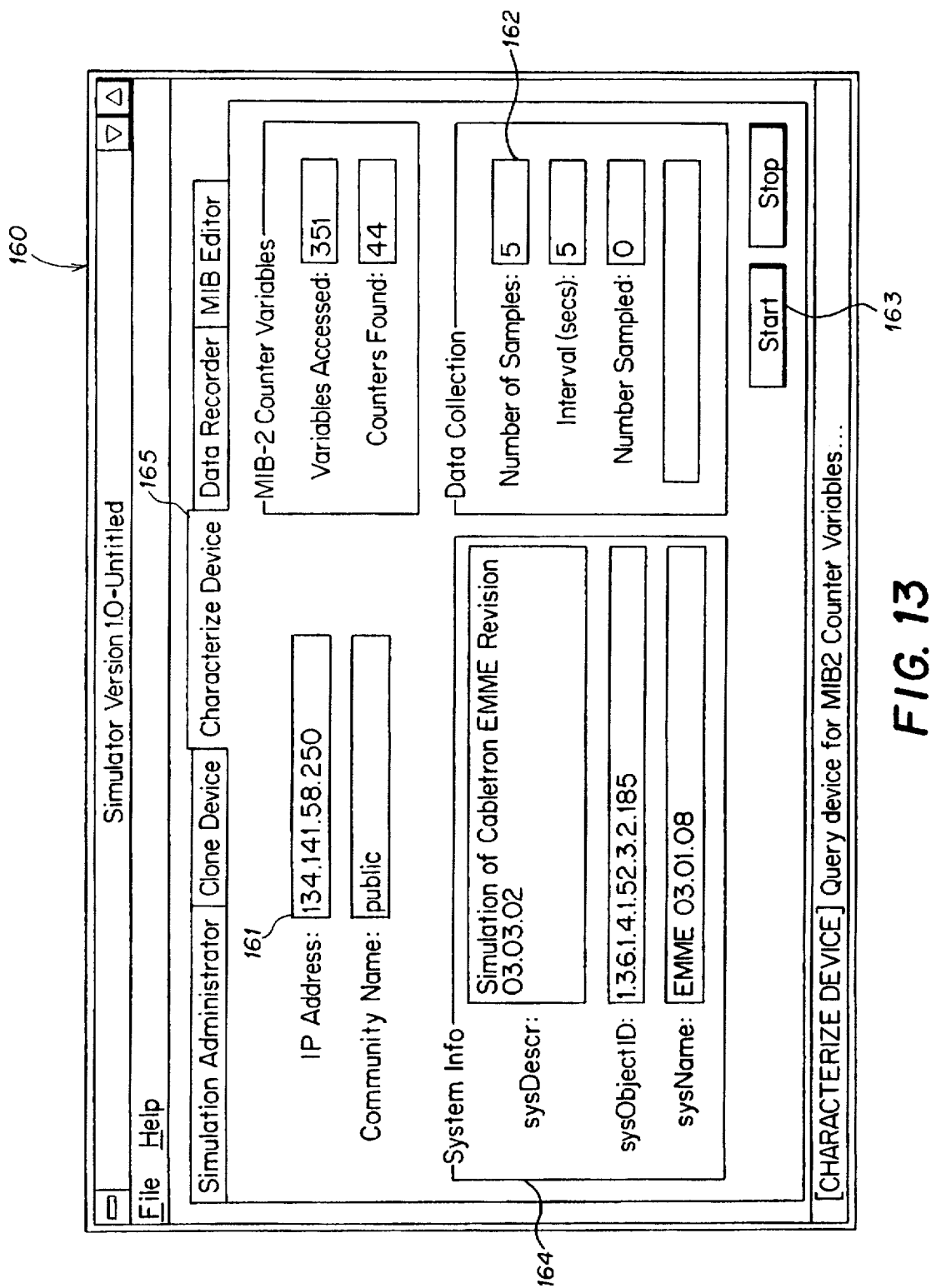
FIG. 13 shows a user interface with a characterize device menu.

FIG. 13 shows an interface 160 wherein a user has selected the tab-like button "Characterize Device" 165 at the top of the screen. The user has entered an IP address in the "IP Address" area 161, which identifies the remote device, running an SNMP agent, to be characterized. In the "Data Collection" area 162, the user enters the number of samples (sample count) to be taken from the remote SNMP agent and the time interval (sample interval) to wait between samples. The greater the number of samples, the more reliably the device will be characterized, since a larger number of samples provides a better set of SNMP instance values to characterize the variables. When the user has entered the IP address and the sample count and interval information, the user then selects the "Start" button 163 to begin the device collection and characterization. The "System Info" area 164 provides information about the remote device being characterized. After the characterization is finished, the user will be prompted to save the dataset for use in a simulation.

Figure 14:
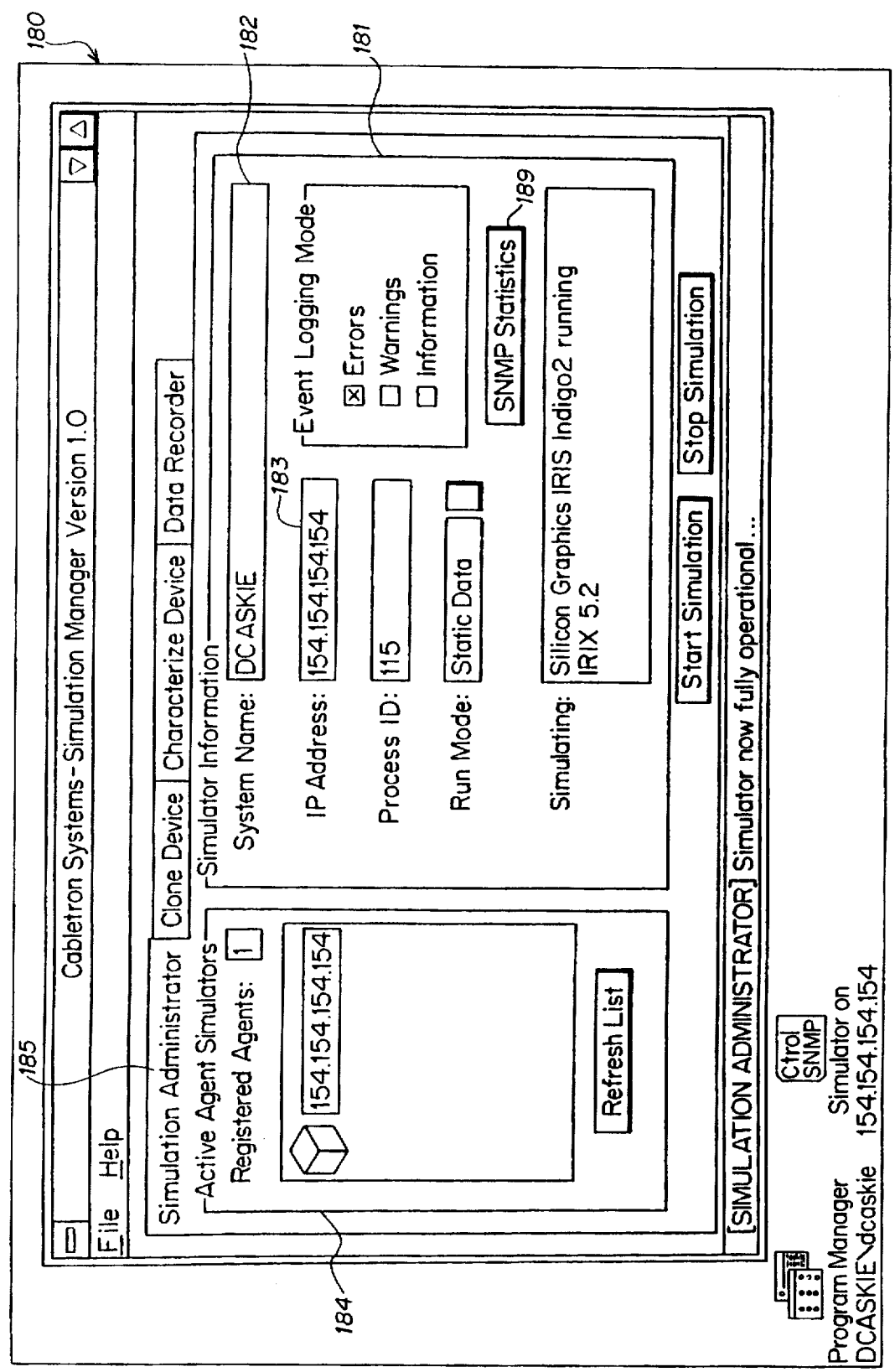
FIG. 14 shows a user interface with a simulation administrator menu.

FIG. 14 shows a user interface 180 of a simulation manager program, where "Simulation Administrator" 185 has been selected. The "Simulator Information" area 181 is used to display data from the dataset during the simulation. The area marked "System Name" 182 contains the name of the device being simulated, and area 183 contains that device agent's associated IP address. In TCP/IP networking, an IP address maps to a system name, and other devices can connect to a device by specifying its system name, which gets translated into the IP address. A separate IP address is assigned to each agent engine 22A–N running on the computer 20 (see FIG. 3). The window marked "Active Agent Simulators" 184 identifies the one ongoing simulation.

Figure 15:
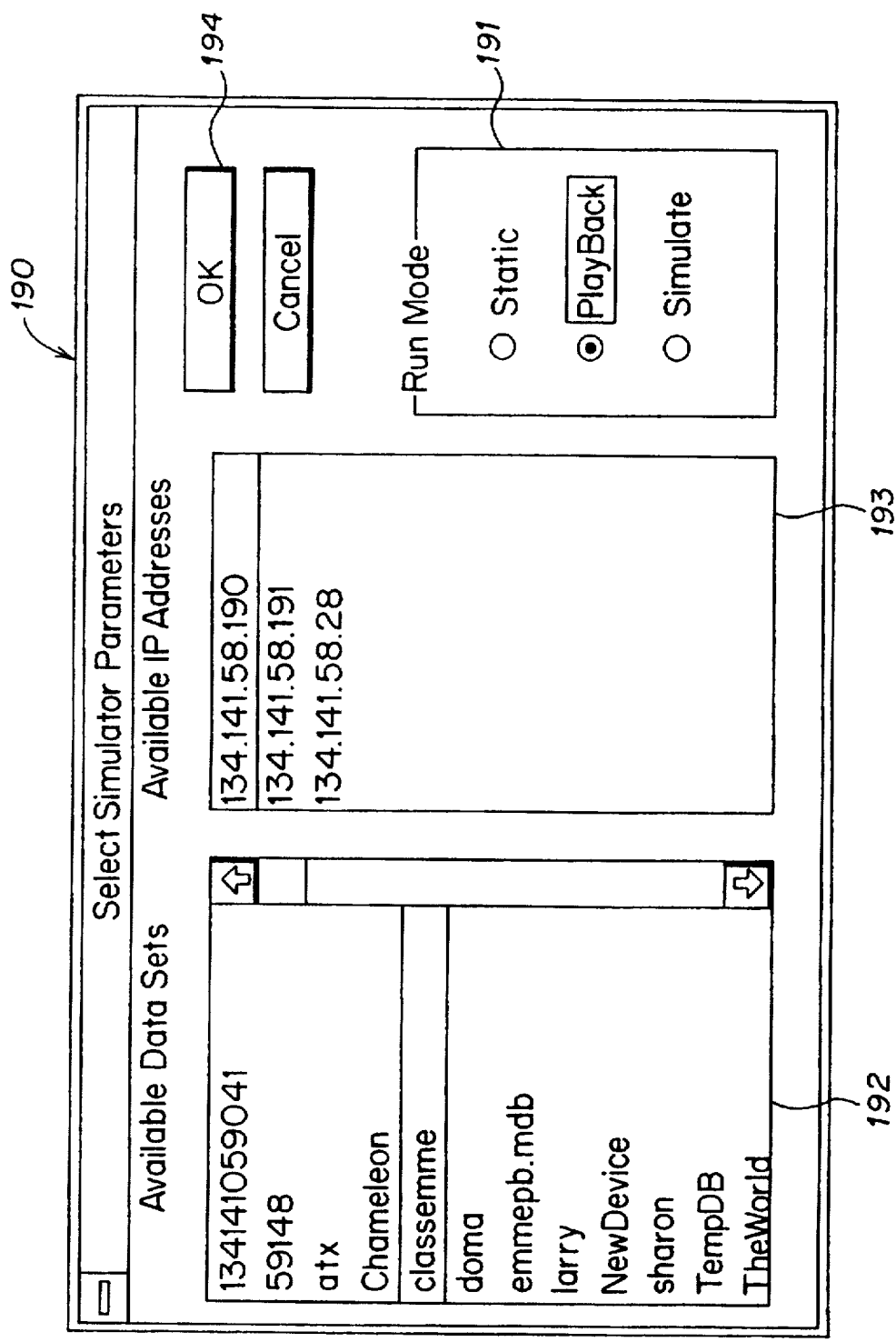
FIG. 15 shows a user interface during a playback mode simulation.

A user interface 190 in FIG. 15 permits selection of the dataset to be used during simulation; in addition, it allows the user to select a simulation mode (static, playback or simulate) in the area marked "Run Mode" 191. In FIG. 15, the user has selected the "Playback" mode. The names of the available datasets are shown in the left-hand box labeled "Available DataSets" 192, and the IP address associated with each dataset is shown in the right-hand box labeled "Available IP Addresses" 193. Since each dataset represents all of the SNMP information that will be simulated for a device, each has an associated IP address which it will use during its simulation.

A static mode simulation will first be described. In the static mode, SNMP data provided in response to an SNMP query contains the same variable value for all queries, regardless of the time or number of queries. If the simulation in static mode is using a recorded dataset, it uses only the first instance value recorded for each variable in the first time slot of the recording. To begin, the user selects "Static" in the "Run Mode" area 191 and hits the "OK" button 194.

Figure 16:
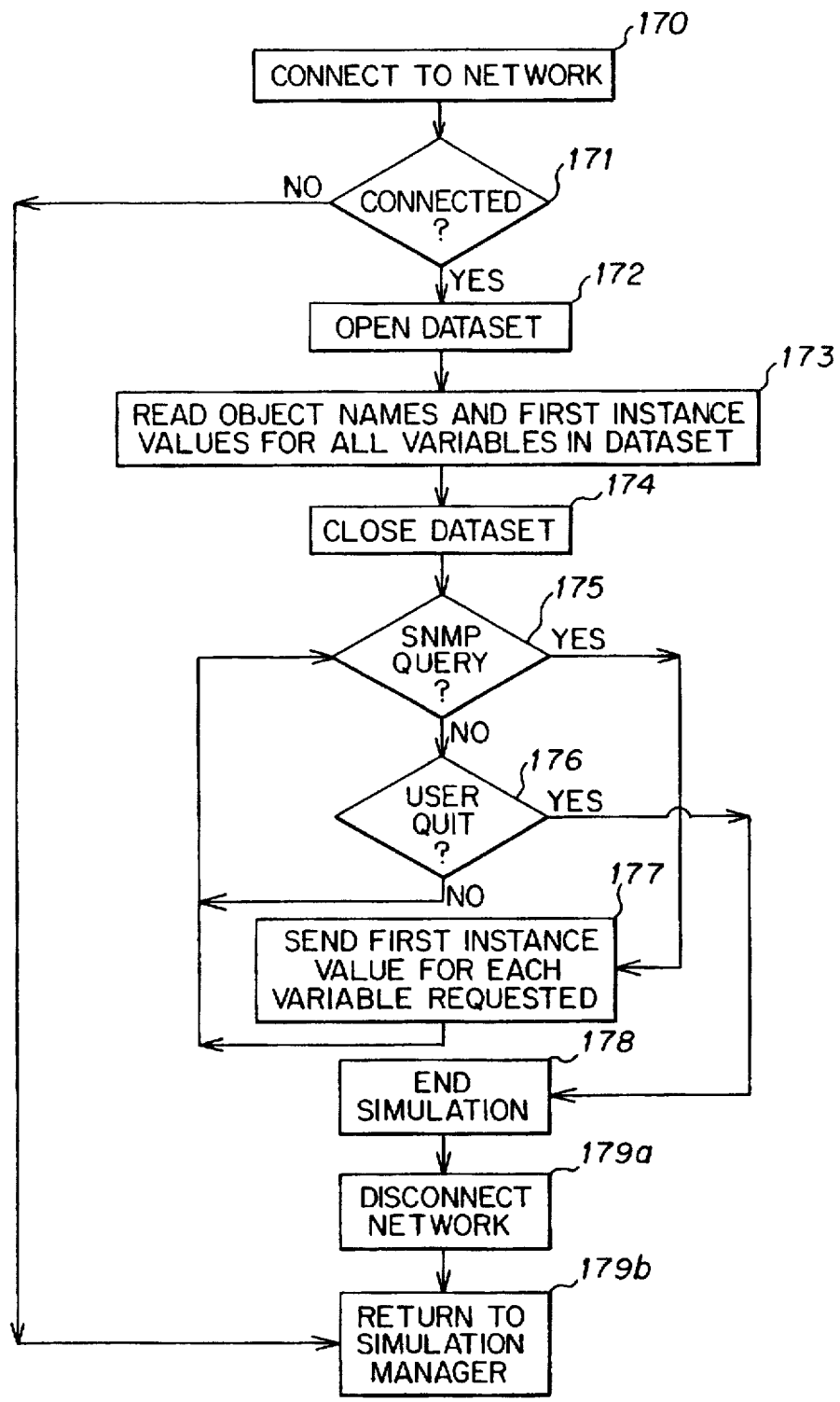
FIG. 16 is a flowchart of operations during a static mode simulation.

FIG. 16 illustrates the operations performed during a static mode simulation. First, a network connection (steps 170–171) is established for the IP address of the dataset. Then the simulator agent engine opens the selected dataset (step 172). Next, the agent engine reads the names and first instance values (the only values available if the dataset was created with a cloned device) from the dataset (step 173). The dataset may then be closed (step 174). The agent engine then enters a loop which checks for incoming SNMP queries from other remote systems on the network (step 175), and also checks if the user wants to quit (step 176). When an incoming query arrives at the general purpose computer running this agent engine, the agent engine responds to the query by providing the first instance value in the dataset for each variable name which was requested in the query from the remote system (step 177). Then the agent engine returns to its loop (steps 175–176) of checking for queries and checking if the user wants to quit the simulation. If the user quits, the network connection is closed and control is returned to the Simulation Manager (steps 178–179b).

It should be noted here that this description of the static mode is only one method of performing such an operation. It will be clear to those skilled in the art of computer software that there are many ways of implementing a process of statically simulating the SNMP data.

The playback mode will next be described. Returning to interface 190 of FIG. 15, the user enters a dataset and its IP address and then selects "Playback" under "Run Mode". The datasets and IP addresses appear as they did for the static mode in the left and right hand boxes (192–193) of the interface, respectively. The user may select any dataset available, but technically, a playback simulation can only be run with a dataset having multiple instance values for its variables. If a cloned dataset is chosen, only one value will be "played" and the simulation will end unless a looping feature (described hereinafter) is used. The user hits the "OK" button 194 to begin.

In the playback mode, the agent engine duplicates the data in a recorded dataset. Any remote incoming SNMP requests are responded to with the instance values as they appear in the position within the dataset corresponding to the time since the beginning of the simulation. Thus, when the playback simulation begins, a timer is started which tracks the elapsed time. When a remote request for a variable instance is received, the agent engine returns the instance value coinciding with that timeslot, from the recorded data.

Figure 17:
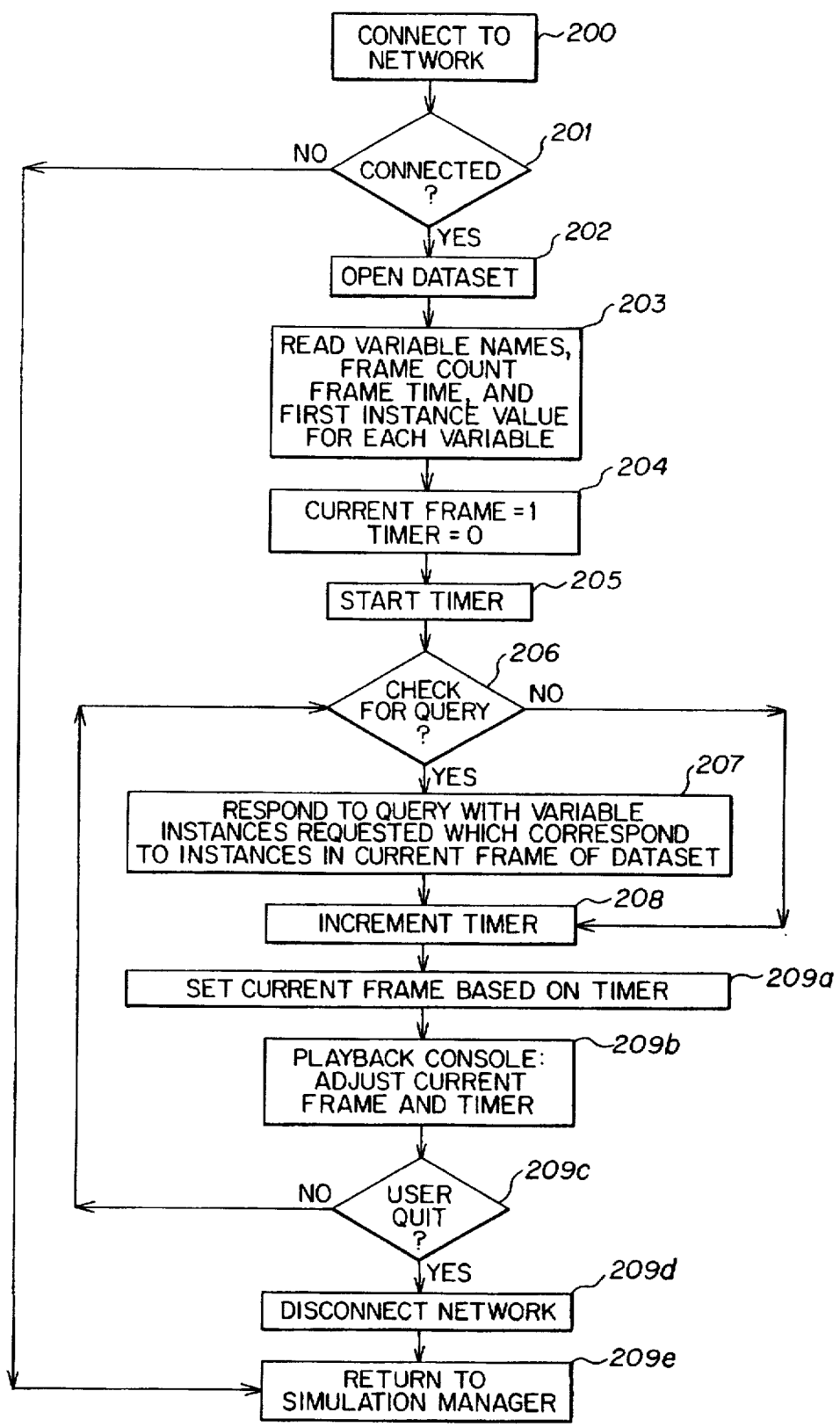
FIG. 17 is a flowchart of operations during a playback mode simulation.

FIG. 17 illustrates the processing flow of the agent engine during a playback simulation. First, as in static mode, a network connection is established (steps 200–201). If this fails, the simulation cannot be performed and the procedure ends (step 209e). Assuming it can proceed, the selected dataset is opened (step 202), this dataset will have been produced by recording from a device, and will have a plurality of variable names listed. For each variable name, there will be a corresponding list of values for each sample time (query) that took place during the recording process. The sample time slots may be referred to as "frames". Like frames in a movie, each frame is a snapshot of how all of the variables appeared at the moment they were sampled, during recording. The variable names, total frame count, individual frame time, and the first instance values will be read from the dataset (step 203). The first instance value for each variable will be the instance value in frame number "1" of the recorded dataset. The agent engine will set the current frame to 1, and a timer will be set to 0 (steps 204–205). The current frame indicates which frame (of the dataset instance values) should be sent at the time of a query arriving at the agent engine.

The simulation begins by checking for an incoming query (step 206). If a query arrives, the SNMP agent engine responds (step 207) by sending the instance values requested (e.g., the values in the current frame). After the response is sent, the timer gets incremented (step 208) and the current frame is then set based upon the new value of the timer (step 209a). For example, if the recorded data was sampled 10 times, at a sampling interval of 5 seconds, there will be 10 frames of data representing the instance values for the recorded SNMP device at 5 second intervals, for a total sample/simulation time of 50 seconds from start to end. As the timer gets incremented, the appropriate frame is sent in response to a remote query, based upon which frame corresponds to the current setting of the timer when the query arrives at the agent engine. There are many ways to implement such a query response strategy, and the present embodiment is not exclusive.

After the timer is incremented (step 208) and the current frame set based on the incremented time (step 209a), the agent engine checks for adjustments to the current frame number and the timer which may have been made by a playback console which can alter the values of the timer and the current frame (step 209b). The agent engine process then continues and checks to see if the user desires to quit (step 209c). If not, then the process repeats itself by performing "Check for Query" (step 206). If the user quits or the simulation has ended, the network disconnects (step 209d) and the agent engine returns to the simulation manager (step 209e).

Figure 18:
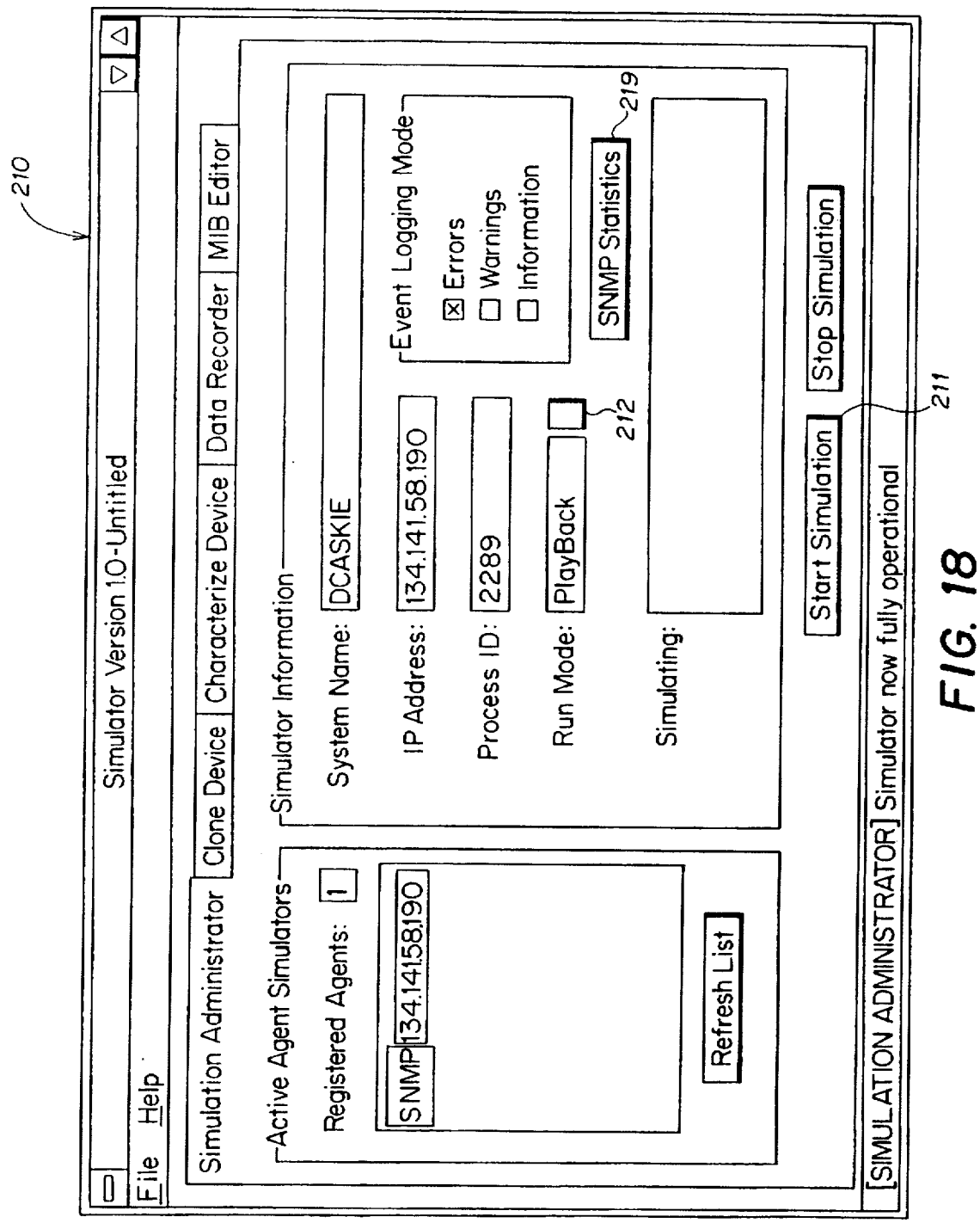
FIG. 18 shows a user interface during a playback mode simulation.
Figure 19:
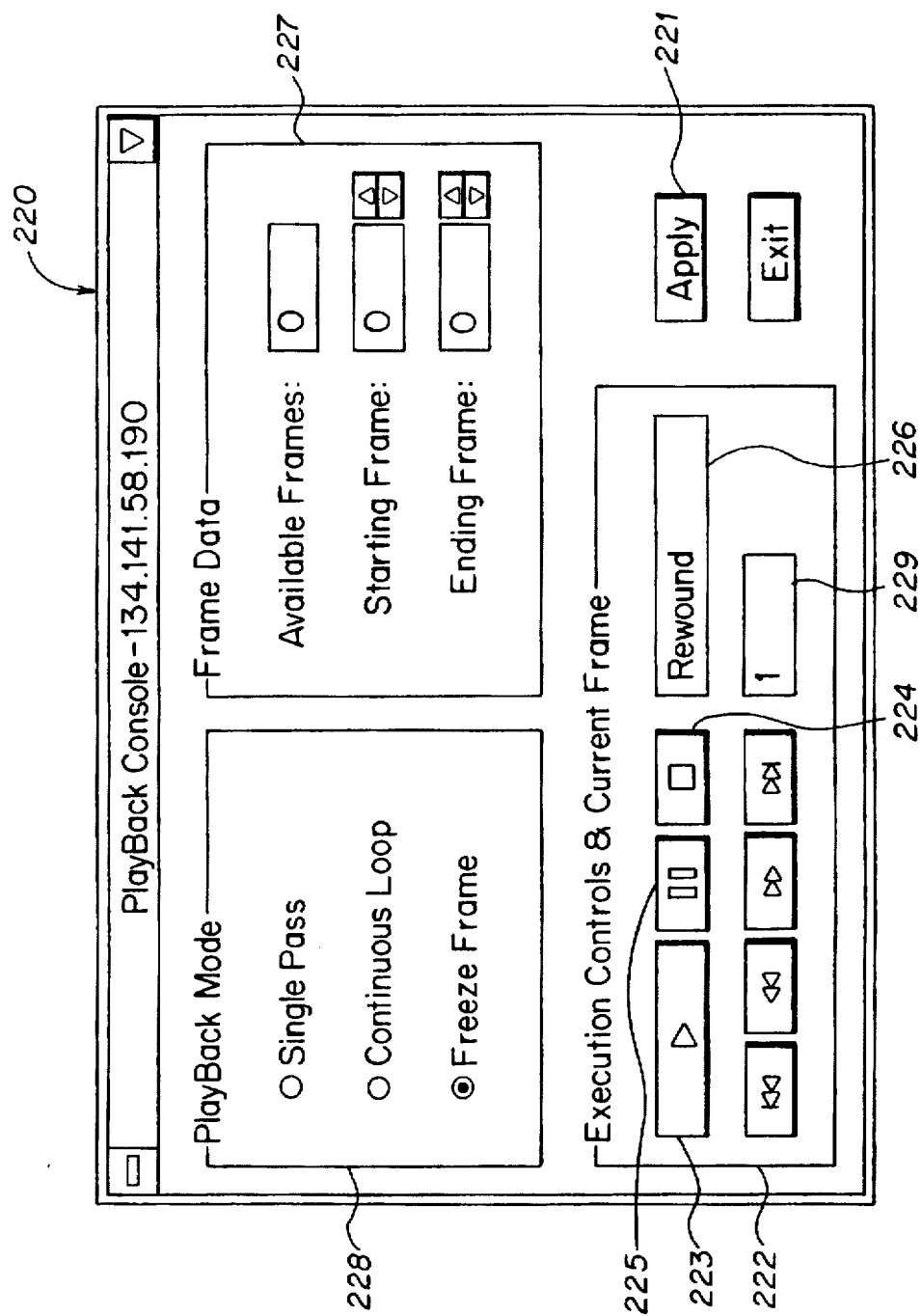
FIG. 19 shows a user interface of a playback console which allows manipulation of a playback simulation.

As noted above, the playback console (step 209b) allows modification of the current frame and timer in relation to the recorded data in the dataset. As illustrated in FIG. 18, after the user selects "Start Simulation" 211 from interface 210, a playback simulation as described above begins executing. If the user desires to modify the playback simulation, he/she clicks on the "Run Mode" button 212 and the playback console interface 220 appears as shown in FIG. 19. In this interface, the user is able to precisely control the playback mode simulation of the SNMP agent engine. In an area entitled "Execution Controls & Current Frame" 222, the user can start, stop, rewind and fast-forward the frames of the dataset containing the recorded SNMP data. The buttons on the lower left symbolically depict their functionality: start button 223 (right arrow) is used to restart the simulation; stop button 224 (square) stops the simulation at any point; pause button 225 (two vertical lines) can be used to pause the simulation. The four buttons in the lowermost row enable fast forwarding and rewinding of the simulation. The small window 226 displays the status of the user-selected function.

The "Frame Data" area 227 in FIG. 19 displays the total number of frames in the recorded dataset, the starting frame and the ending frame. In this area, the user can select a subset of frames to be "played" from the dataset. The arrows to the right allow the user to increase or decrease the number of the frames used during a playback simulation. Thus, if the SNMP dataset contained 100 frames, but the user only wished to simulate the data for frames 25–50, the user would set the "Starting Frame" field to 25, and the "Ending Frame" field to 50, and then press the right arrow button 223. This will restart the simulation using the selected frames.

The "Playback Mode" area 228 in FIG. 19 provides three options: "Single Pass", "Continuous Loop", and "Freeze Frame". The user may select one of these options and press "Apply" 221 to execute. This will restart the simulation with the new mode enabled.

FIG. 20 summarizes in table form the differences in the various playback modes. "Single Pass" causes the agent engine to playback the recorded dataset once, and then end. That is, all of the instance values of the dataset (or those selected as a subset by the user) will be passed through once during the simulation. Incoming requests for SNMP data will be handled as normal, but when the dataset has produced its last frame instance value, this instance value will be the response value for all subsequent incoming requests for SNMP data to the agent engine.

When a "Continuous Loop" simulation comes to the last frame in the dataset (or the last frame selected by a user), the agent engine will repeat the process. Thus, continuous loop simulations can be run in playback mode and will not end until the user stops the simulation by pressing the stop button 224, or quits the simulation. A user may also specify a starting frame for a continuous loop playback.

If the "Freeze Frame" option is selected, the simulation will be stopped, and the user will be able to advance one frame at a time through the simulation by using the ">>" fast forward button and "<<" rewind buttons (in area 222) to step one frame at a time through the dataset. Thus, as the agent engine receives incoming requests for its SNMP data, it will respond with the data from the frame indicated in the lower window 229 of interface 220 (FIG. 19).

By definition, the static and playback simulation modes are based on a fixed number of instance values in a dataset.

Although the agent engine task can run for a long time in either of these simulation modes, the values that are returned have been entered in the dataset before the simulation began. In animation mode, the characterization file allows an agent engine to use a projection algorithm to extrapolate the simulated device's behavior over a potentially indefinite period of time.

Returning to FIG. 15, the user selects "Simulate" in the "Run Mode" area 191 to run an animation simulation. The datasets and IP addresses appear as they did for the static and playback modes of simulation in the left and right hand boxes 192, 193 of the interface, respectively. The user may select any dataset available, but a simulation mode can only be run when a characterization file is selected. If a cloned or recorded dataset is chosen, the simulation will not begin. When the user has selected a valid characterization file and an IP address for the device being simulated, he/she then hits the "OK" button 194 and is presented with interface 250 of FIG. 22. Note that the fields in the area marked "Simulator Information" 251 have been filled in with information concerning the selected dataset.

Figure 21A:
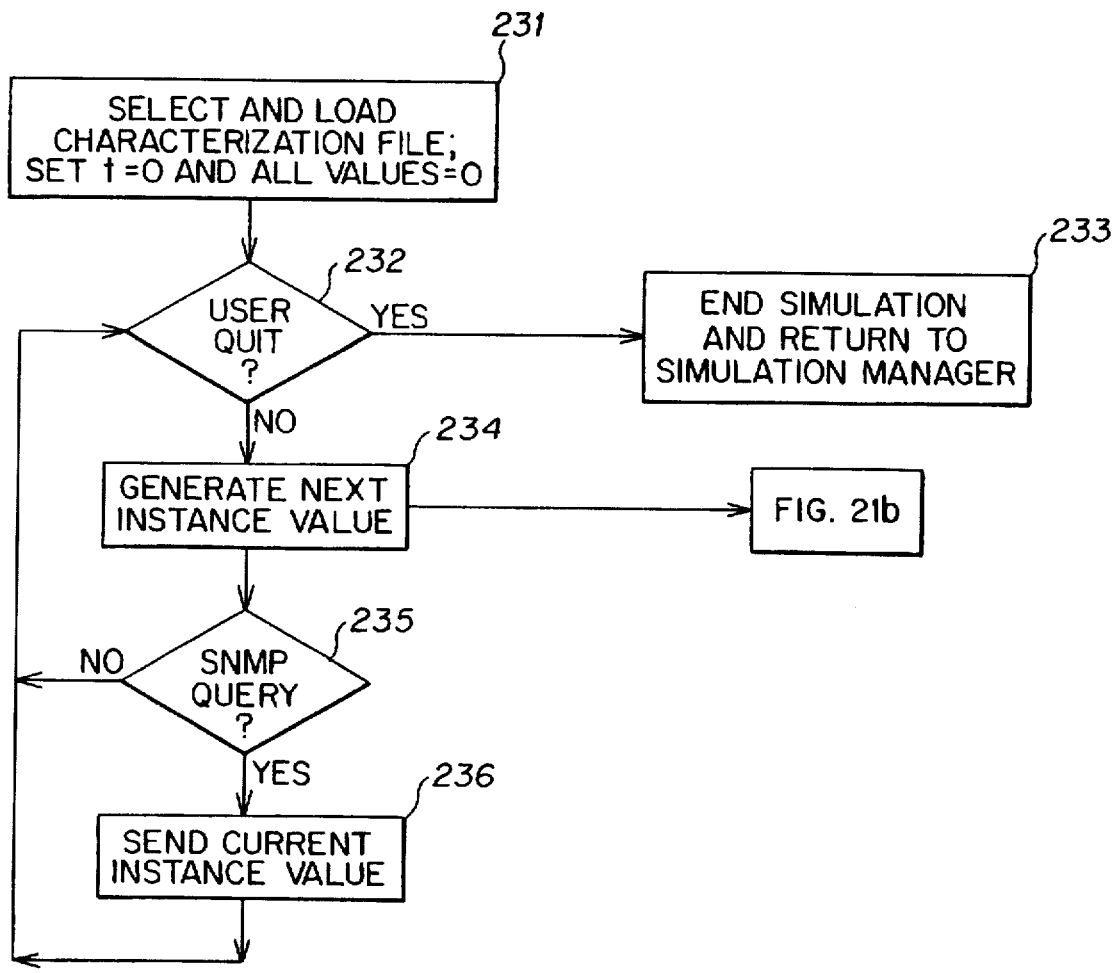
FIG. 21a–21b is a flowchart of operations during an animation mode simulation.
Figure 21B:
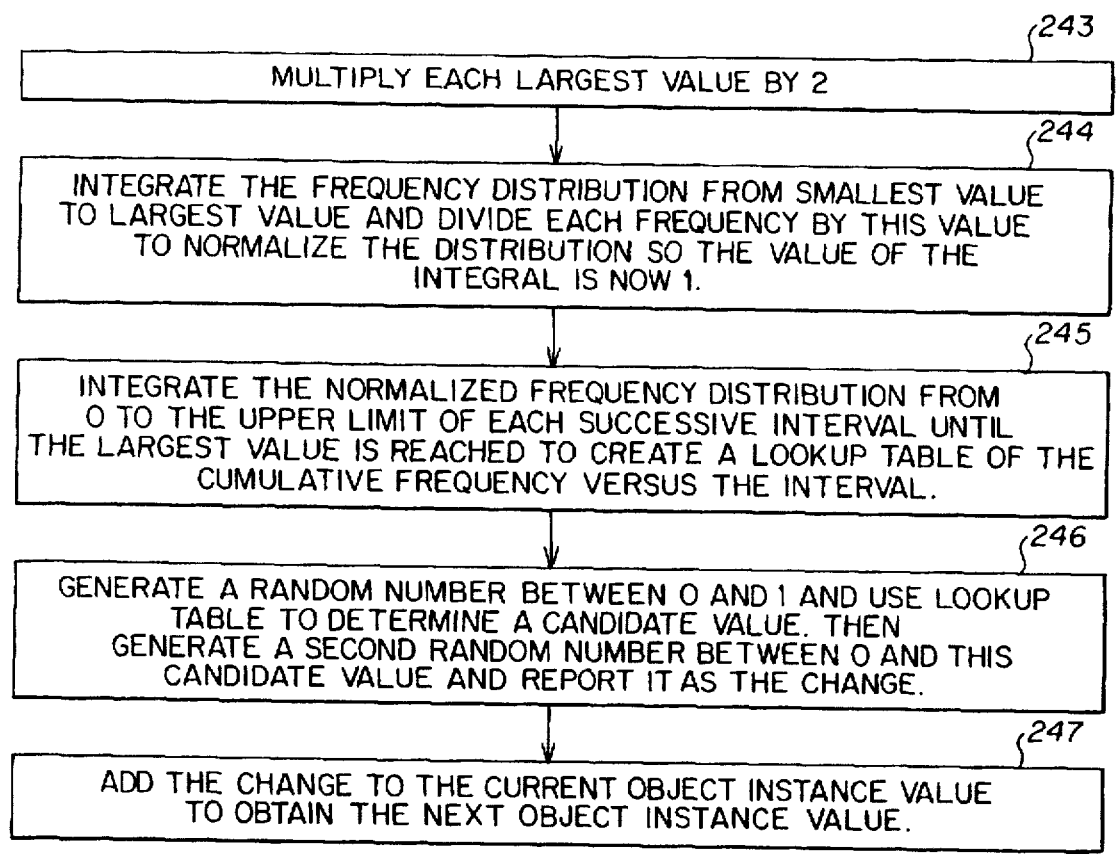

FIG. 21a–21b illustrate the operations performed in the animated mode. Assuming a network connection is established, the agent engine loads into memory the characterization file which the user selected and sets the timer at t=0 and sets the present value of each variable=0 (step 231). The agent engine then enters a loop which checks if the user wishes to quit (step 232); if so the simulation ends and control returns to the Simulation Manager (step 233). If not, the agent engine will continuously calculate and store the next instance value for each variable (step 234).

FIG. 21b is a detailed flowchart of how the next instance value is generated. The data in the characterization file will be used so that values can be predicted based on the probabilities computed, and responses to queries will be realistic. The process of predicting the next value uses a procedure known as the Monte Carlo algorithm. For an explanation of the Monte Carlo algorithm, see Ulam, S. M.: "Monte Carlo Calculations in Problems of Mathematical Physics, in "Modern Mathematics for the Engineer", E. F. Beckenbach, Second Series, McGraw Hill, New York (1961).

First, the largest scaled value (LV) of each variable is multiplied by 2 and held in memory (step 243). This value (2LV) will be one selection criteria for a lookup table.

Next, the frequency table (for each variable) is integrated by integrating the count values over the entire range to produce a "first integral," and then normalizing the distribution of frequencies in the frequency table by dividing each count value by the first integral to produce "normalized count values." Next, the normalized count values are integrated from a first interval value (first range limit) to an upper limit of each successive cummulative interval value, producing a set of "second integral values" (altogether step 245). That is, the normalized count values are integrated from 0 to the first interval value, then 0 to the second, 0 to the third, etc., until all of the 100 interval values (in the previous example) have been integrated. These second integral values represent the probability that a variable will be less than the value of the upper limit of that range. These second integral values are stored in a lookup table; each variable has its own two-column lookup table which comprises the 100 second integral values and their corresponding "range limit values" (cummulative interval values). The lookup table values are generated once at initialization and used subsequently for determining a next instance value as described below.

Next, a random number generator is used (step 246) to generate a "first random number" between 0 and 1. Then, the lookup table is consulted and a second interval value is selected which is just below the first random number (note that the second integral values will range from 0 to 1 and are positioned in increasing order). The corresponding range limit value (for the selected second integral value) is then multiplied by 2LV/M to produce a "candidate value" (CV).

Again, we use a random number generator to generate a "second random number" between 0 and the candidate value; this second random number is the "change" which is stored, along with the corresponding variable name, as follows:

| Variable Name | Change |
|---|---|
| a | 3 |
| . | . |
| . | . |
| . | . |

This process is repeated for every variable, except for a variable in any group having the largest mean value ("LM variable"); for an LM variable, where $K_{ij}=1$, the formula $$y_i = \sum_j K_{ij} x_j$$

is used to calculate $y_i$ (the change in the LM variable) where $x_j$ is the changes for every other variable in the group. The change in the LM variable is then added to the above table, so we now have the changes for all variables. The change for each variable is then added to the current instance value of the corresponding variable (in the MIB of the device simulator) (step 247), and the new values are stored in the MIB as the new current instance values. The process then repeats to calculate the next instance values.

Figure 23:
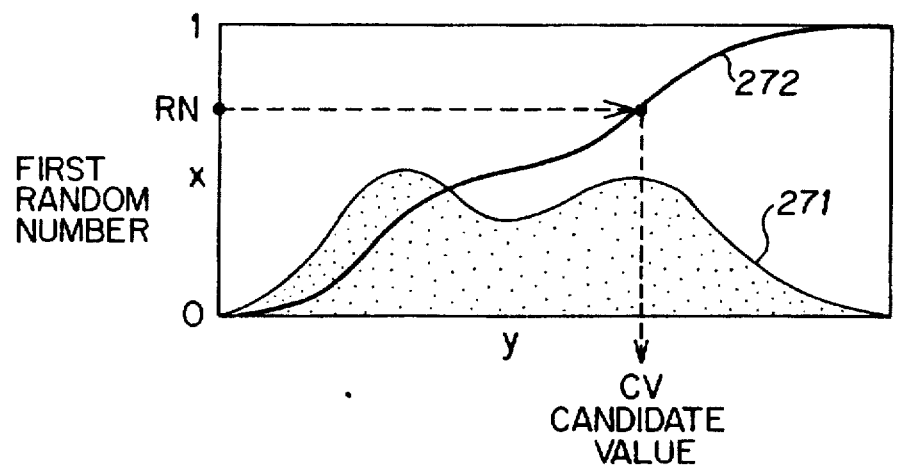
FIG. 23 illustrates a normalized frequency distribution used to calculate a change in an instance value.

This process is generally illustrated in FIG. 23, wherein curve 271 represents a function p(y) representing a normalized frequency distribution over time (the y axis), and curve 272 represents the integral of the normalized frequency distribution, $$F(y) = \int_0^1 p(y) dy,$$

which has a maximum value of 1 (on the x axis). A first random number (RN) between 0 and 1 is shown on the x axis, and the corresponding candidate value (CV) from curve 272 is shown on the y axis. Then, a second random number is generated between 0 and this candidate value. The second random number is the change to be made to the counter variable (from its current value). The change gets added to the variable's current instance value to obtain the new instance value (step 247).

Returning to FIG. 21a, at the time an SNMP inquiry is received at the device simulator 40 (step 235), the current instance value for each requested variable is sent out as a response (step 236). After the response has been sent to the remote requesting device on the network, the agent engine returns to its loop of checking if the user wants to end the simulation (step 232), and checking for additional SNMP queries from network devices (step 235).

The process of generating an animated SNMP response value using the above-identified computer-implemented process may provide statistical characteristics for all of the variables obtained to an accuracy within an order of one percent. This is an extremely accurate representation of the SNMP data for the real device being simulated. Those skilled in the art will appreciate the advantages of this system in being able to accurately represent SNMP device data on a network for extended periods of time. Furthermore, though the steps of implementing such a process are disclosed, they are by no means the only way to perform such operations. The general principles of the invention can be implemented in various ways and in many programming languages and on various hardware platforms.

More specifically, the above-described process enables one to predict instance values, versus the actual recorded values, over a sampling interval with an error on the order of magnitude ($0_1$) of one percent. This enables a sampling period on the order of one hour, to provide repeatable predicted values. For example, if a first dataset is recorded between the hours of 10:00 A.M. and 12:00 P.M. on a given network device, and a second dataset is recorded from the hours of 12:00 P.M. to 2:00 P.M. on the same device, if a simulation is run with either of the first or second datasets, all of the predicted instance values will be correlated, which means that the changes in values (overall) are the same for the simulator and the real device on an order of magnitude of one percent. For example, if the "packets per second" variable for the real device has a mean value of 1000, and the packets per second mean value for the simulated device has a value of 980, then the real and simulated devices are within an order of magnitude of one percent (here two percent.)

Figure 22:
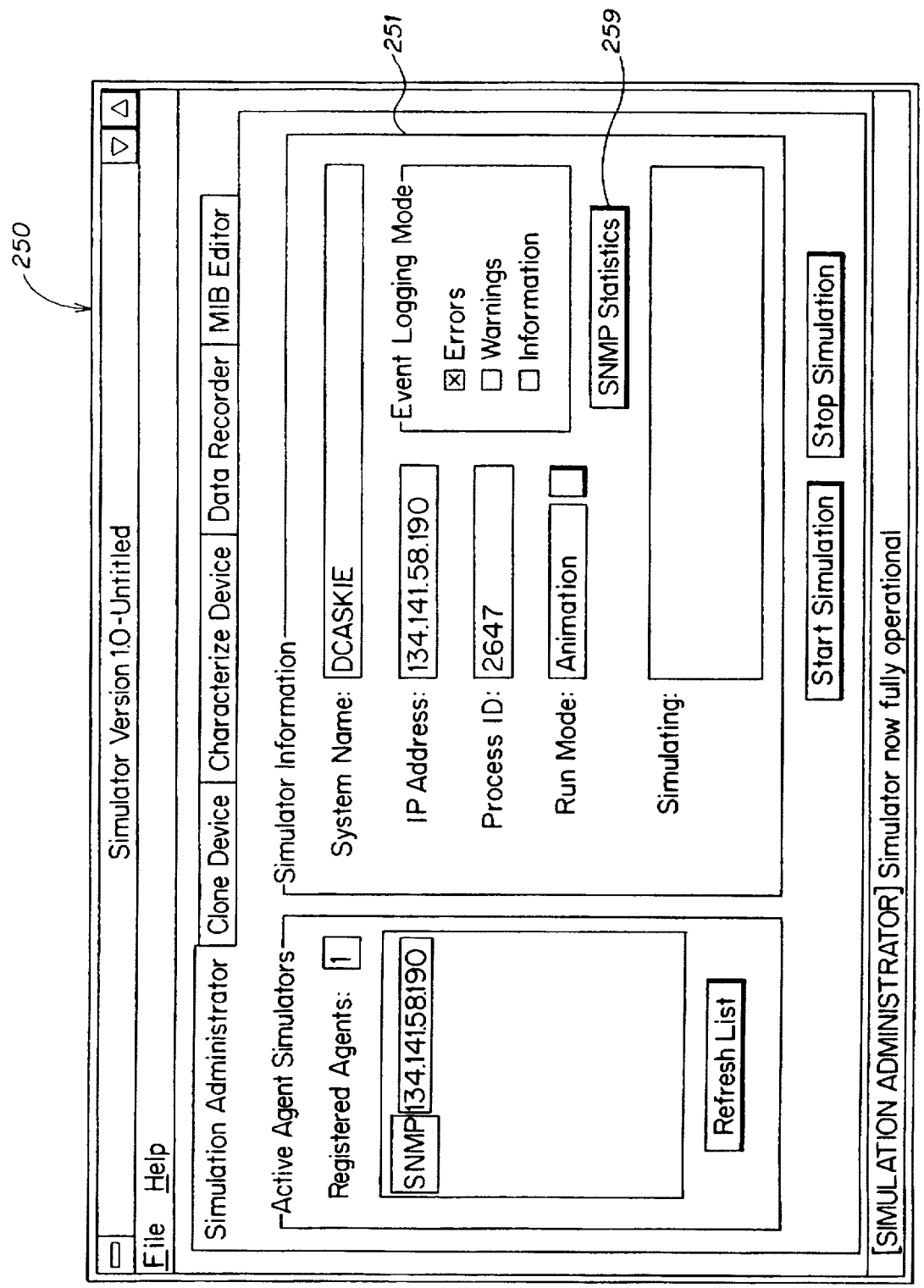
FIG. 22 shows a user interface during an animation mode simulation.
Figure 24:
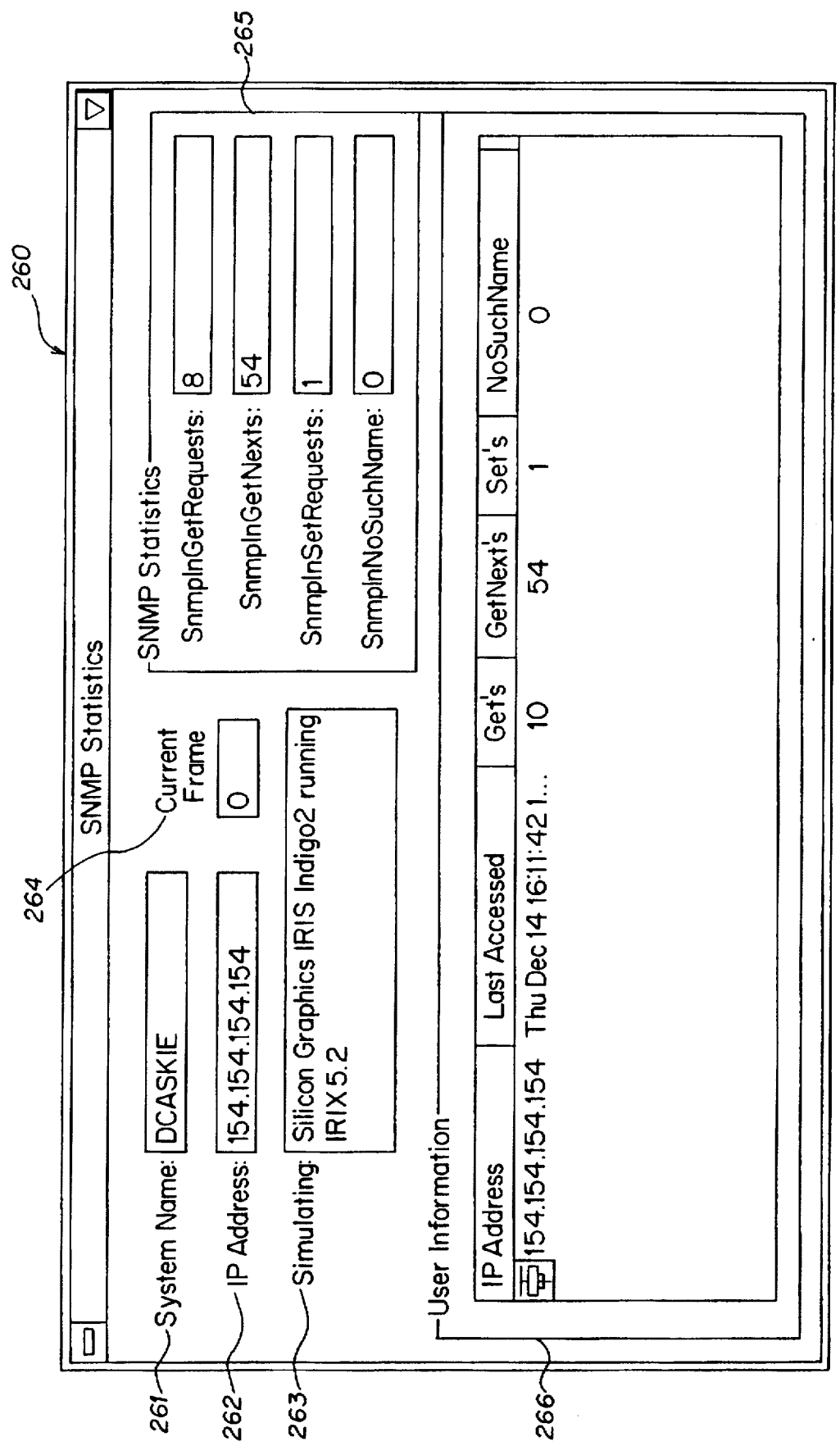
FIG. 24 shows a user interface with SNMP statistics.

A final aspect of the present embodiment is a system for viewing SNMP statistics while the SNMP agent engine is performing a simulation. FIGS. 14, 18 and 22 all illustrate an interface for which the user has the capability to monitor the SNMP statistics which are maintained by the agent engine as the simulation progresses. In each of these figures there is a button labeled "SNMP Statistics" (189, 219, 259); when pressed, it brings up interface 260 (see FIG. 24) which shows the statistics of the incoming SNMP requests to the agent engine during the course of the simulation. On the left, the system name (261), IP address (262), and a description (263) of the device being simulated are displayed. The current frame (264) is also displayed; this value identifies the frame of a recorded dataset which is currently active, and is only displayed if a playback simulation is in progress. The area of the interface labeled "SNMP statistics" (265) shows the values of certain counters for incoming requests received at the agent engine. The lower area (266) of the interface ("User Information") provides when the last access to this simulated device was performed, and the number of requests in the form of "Get's", "GetNext's", and "Set's". These are various forms of requests that the agent engine can receive in order to respond with SNMP instance values from the dataset, or with an animation simulation value via the characterization file. The ability to view the statistics of the agent engine while it is running is useful in being able to diagnose network conditions and has other advantages evident to those skilled in the art.

The system of the present invention is not limited to simulating SNMP data on a network. The general principals of the system can be applied to the simulation of many types of network devices which utilize various protocols. The concept of simulating a network device in the animation mode can be used to generate data of many of the various TCP/IP supported protocols, as well as many other networking protocols. It is important to note here that SNMP can be replaced with various other protocols and the functionality of the present invention can be utilized to effectively simulate these protocols as well.

Figure 25:
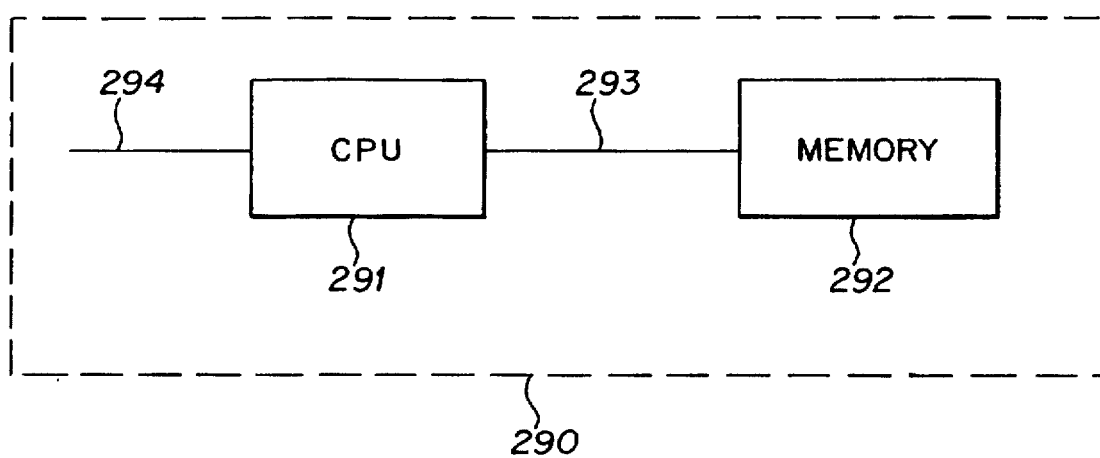
FIG. 25 is an illustration of a general purpose computer apparatus which can be used to implement the present invention.

Any of the above embodiments may be implemented in a general purpose computer 290 as shown in FIG. 25. The computer may include a computer processing unit (CPU) 291, memory 292, a processing bus 293 by which the CPU can access the memory 292, and access to a network 294.

The invention may be a computer apparatus which performs the functions of any of the previous embodiments. Alternatively, the invention may be a memory 292, such as a floppy disk, compact disk, or hard drive, which contains a computer program or data structure, for providing to a general purpose computer instructions and data for carrying out the functions of the previous embodiments.

Having now described various embodiments of the invention, numerous modifications will be apparent to one of ordinary skill in the art and are contemplated as falling within the invention as defined by the appended claims.

We claim:

1. A computer-implemented method for simulating a device on a computer network, the device having a management agent and the method comprising the steps of:
   (a) defining a device dataset having a plurality of counter variables with instance values which change over time and describe the behavior of a device on a network over time;
   (b) creating a characterization file from the device dataset based on correlations among the plurality of variables and their instance values; and
   (c) using the characterization file to generate predicted instance values for transmission on the computer network for simulating the management agent of the device.

2. The method of claim 1, wherein the variables are SNMP variables and the simulated device communicates with a remote network management station via the SNMP protocol.

3. The method of claim 1, wherein step (c) includes:
   in response to a request received by the simulated device at a first time slot, determining a response value based on the predicted instance value at the first time slot; and
   outputting the response value.

4. The method of claim 1, wherein step (a) includes:
   selecting the device dataset from a pre-defined set of datasets, each of the datasets containing preset instance values for the variables.

5. The method of claim 1, wherein step (a) includes:
   selecting the device dataset from a pre-defined set of template datasets, each of the template datasets containing a plurality of variables without instance values; and
   populating the selected template dataset with instance values for the plurality of variables.

6. The method of claim 5, wherein the populating step includes:
   obtaining the instance values from a pre-existing dataset.

7. The method of claim 1, wherein step (a) includes:
   selecting a sample count and sample interval for collection of instance values from a remote device on a computer network over a sample period;
   querying the remote device for the instance values at spaced time intervals based on the sample count and sample interval over the sample period; and
   storing the instance values in the device dataset.

21

8. The method of claim 1, wherein step (c) includes:
loading the characterization file into an agent engine; and
selecting a first time interval for the simulation, wherein at each first time interval, an updated predicted instance value for one or more of the plurality of variables is determined.

9. The method of claim 1, wherein step (b) includes:
calculating a linear correlation coefficient for each pair of variables, and if the correlation coefficient is larger than a pre-determined value, establishing a variable group for the corresponding variables and storing the same in the characterization file.

10. The method of claim 9, wherein the step of calculating the correlation coefficient includes:
use of a singular value decomposition technique.

11. The method of claim 1, wherein step (b) includes:
calculating Probrs and Probd to determine if two variables are correlated.

12. The method of claim 1, wherein step (c) includes:
using a frequency table of instance values for each variable to generate the predicted instance values.

13. A computer system attached to a network comprising:
a computer program stored on a computer-readable medium which implements the method steps of any one of claims 1–12 for simulating a management agent on a computer on the network.

14. A computer network system comprising:
a plurality of computers attached to a network, wherein at least one computer has communications capability on the network with at least one other computer;
a computer program stored on a computer-readable medium, the program being executable in a memory of the at least one computer;
wherein the at least one computer perfornms the method steps of claim 1.

15. A computer system having a program stored on a computer-readable medium for simulating Simple Network Management Protocol (SNMP) device communications on a network comprising:
means for defining a device SNMP dataset having a plurality of SNMP variables;
means for creating a characterization file from the device dataset based on correlations among the variables over a period of time; and
means for simulating an SNMP device and its SNMP communications by using the characterization file to create a simulation of an SNMP device on the computer network.

16. A computer system for simulating Simple Network Management Protocol (SNMP) device communications on a computer network comprising:
means for creating a dataset containing SNMP variable names and values, wherein the variable names and values are each associated with first time intervals;
means for simulating an SNMP network device, by the computer system on the computer network, by reproducing the SNMP variable names and values in response to SNMP queries to the computer system, wherein the reproduced SNMP variable names and values correspond to the SNMP variable names and values in the dataset.

17. The computer system of claim 16, wherein the means for creating the dataset includes:
means for querying, at the first time intervals, a real SNMP network device for SNMP responses, wherein the SNMP responses contain SNMP variable names and values from the real SNMP network device; and
means for recording, in the dataset on the computer system, the SNMP responses received during the first time intervals from the real SNMP network device.

18. The computer system of claim 17, including:
means for characterizing the dataset values and produced as animated simulation based on predicted values of the variables.

19. An apparatus, connected to a computer network, used to simulate protocols of certain network devices comprising:
a computer processor;
a memory containing computer readable instructions in the form of a computer program, readable by said computer processor to perform tasks according to the program instructions;
the instructions comprising:
means for capturing protocol data transmitted, for a period of time, onto the computer network from an active computer device which is desired to be simulated;
means for analyzing the captured protocol data to determine characteristics of the data and produce a simulated, non-random representation of how the protocol data behaved over the period of time; and
a means for inter-connecting with other devices on the computer network so that the computer processor produces simulated protocol data which closely represents the captured protocol data.

20. A method of creating a dataset comprising:
selecting a number N of data samples desired for collection from a remote device on a computer network over a sample period;
querying the remote device to identify names of counter variables in the remote device, the counter variables having instance values which change over time and describe the behavior of the device on the network over time;
obtaining a query response from the remote device containing the names of the counter variables;
querying the remote device for the instance value of each counter variable name, N times at spaced time intervals during the sample period;
obtaining a response value from the remote device containing the instance value of each counter variable name for each query, and storing the response values in a dataset; and
producing a simulation using the dataset.

21. A computer-implemented method for simulating a network device comprising:
(a) prior to a simulation runtime;
defining a device dataset having a plurality of counter variables with instance values which change over time and describe the behavior of the device on a network over time;
creating a characterization file from the device dataset based on correlations among the plurality of variables and their instance values; and
(b) during a simulation runtime:
using the characterization file to simulate a device on the computer network by calculating next instance values from the characterization file.

22. The method of claim 21, wherein each next instance value differs from the prior value by no greater than a predefined amount.

23. A computer-implemented method for simulating a network device comprising:
(a) prior to a simulation runtime:
   capturing live data from a network device and storing the same as a device dataset having a plurality of counter variables with instance values which change over time and describe the behavior of the device on a network over time;
   creating a characterization file from the device dataset based on correlations among the plurality of the variables and their instance values; and
(b) during a simulation runtime:
   using the characterization file to simulate a network device by calculating next instance values.

24. A computer-readable medium containing a device dataset having a plurality of counter variables with instance values which change over time and describe the behavior of a device on a computer network over time.

25. The medium of claim 24, wherein the counter variables comprise MIB data from a real or simulated network device.

26. A computer-readable medium containing a characterization file for a network device, the network device having a plurality of counter variables with instance values which change over time and describe the behavior of the device on the network over time, and the characterization file comprises correlated instance values based on inter-relationships of the plurality of variables and their instance values.

27. A simulator comprising a set of computer programs and related data files used to run simulations of a computer network device, including:
   a simulation manager which enables an agent engine to be run in various modes of simulation;
   an agent engine for simulating a network device; and
   data files containing a plurality of counter variables with instance values which change over time and describe the behavior of the network device on the network over time.

* * * * *